(12) United States Patent
Torardi

(10) Patent No.: US 7,601,327 B2
(45) Date of Patent: *Oct. 13, 2009

(54) MESOPOROUS OXIDE OF HAFNIUM

(75) Inventor: Carmine Torardi, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 244 days.

This patent is subject to a terminal disclaimer.

(21) Appl. No.: 11/170,991

(22) Filed: Jun. 30, 2005

(65) Prior Publication Data

US 2006/0110315 A1 May 25, 2006

Related U.S. Application Data

(63) Continuation-in-part of application No. 10/995,968, filed on Nov. 23, 2004, now abandoned.

(51) Int. Cl.
*C01G 27/00* (2006.01)
(52) U.S. Cl. ........................... 423/608; 423/275
(58) Field of Classification Search .......... 423/85, 423/608, 609, 610, 611, 612, 275
See application file for complete search history.

(56) References Cited

U.S. PATENT DOCUMENTS

| | | | |
|---|---|---|---|
| 3,514,252 A | 5/1970 | Levy, Jr. et al. | |
| 3,518,053 A | 6/1970 | Kolznak et al. | |
| 3,676,362 A | 7/1972 | Yates | |
| 3,898,321 A | 8/1975 | Marsh | |
| 4,218,430 A | 8/1980 | Biggerstaff | |
| 4,286,378 A | 9/1981 | Micheli | |
| 4,605,631 A * | 8/1986 | Rossi ............................. | 501/1 |
| 4,664,894 A * | 5/1987 | Suzuki et al. ............... | 423/265 |
| 4,849,378 A | 7/1989 | Hench et al. | |
| 4,944,936 A | 7/1990 | Lawhorne | |
| 5,004,710 A | 4/1991 | Anderson | |
| 5,021,392 A | 6/1991 | Daly et al. | |
| 5,156,828 A | 10/1992 | Degnan et al. | |
| 5,324,848 A | 6/1994 | Haushalter et al. | |
| 5,532,057 A | 7/1996 | Jones | |
| 5,607,994 A | 3/1997 | Tooley et al. | |
| 5,631,310 A | 5/1997 | Tooley et al. | |
| 5,718,878 A * | 2/1998 | Zhang ........................ | 423/610 |
| 5,840,111 A | 11/1998 | Wiederhoft et al. | |
| 5,889,090 A | 3/1999 | Tooley et al. | |
| 5,922,120 A | 7/1999 | Subramanian et al. | |
| 5,959,004 A | 9/1999 | Tooley et al. | |
| 6,168,830 B1 | 1/2001 | Nae-Lih et al. | |
| 6,224,884 B1 | 5/2001 | Remy | |
| 6,444,189 B1 | 9/2002 | Wang et al. | |
| 7,132,093 B2 * | 11/2006 | Kaliaguine et al. ........ | 423/593.1 |
| 7,223,377 B2 * | 5/2007 | Domen et al. ............. | 423/592.1 |
| 2003/0166765 A1 | 9/2003 | Sugihara | |
| 2004/0022722 A1 | 2/2004 | Martin | |
| 2006/0110314 A1 | 5/2006 | Torardi | |
| 2006/0110316 A1 | 5/2006 | Torardi | |
| 2006/0110317 A1 * | 5/2006 | Torardi ...................... | 423/610 |
| 2006/0110318 A1 | 5/2006 | Torardi | |
| 2006/0257312 A1 | 11/2006 | Torardi | |
| 2006/0263291 A1 | 11/2006 | Torardi | |
| 2008/0031806 A1 | 2/2008 | Gavenonis | |

FOREIGN PATENT DOCUMENTS

| | | |
|---|---|---|
| CN | 1097400 A | 1/1995 |
| CN | 1341561 | 3/2002 |
| EP | 0275688 | 7/1988 |
| EP | 0397553 | 11/1990 |
| EP | 0421076 | 4/1991 |
| EP | O421077 | 4/1991 |
| EP | 0774443 | 11/1996 |
| EP | 0899236 | 3/1999 |
| EP | 1422198 | 5/2004 |
| EP | 1484364 | 12/2004 |
| FR | 1597102 A | 7/1970 |
| JP | 01133939 | 5/1989 |
| JP | 07002523 | 9/1991 |
| JP | 04089318 | 3/1992 |
| JP | 05139703 | 6/1993 |
| JP | 200070727 A | 3/2000 |
| JP | 2001031422 | 2/2001 |
| JP | 2001130912 | 5/2001 |
| JP | 2001246247 | 9/2001 |
| JP | 02086823 | 3/2007 |
| NL | 136392 | 2/1973 |
| RU | 2043302 | 9/1995 |
| SU | 247930 | 4/1973 |
| SU | 247930 * | 12/1973 |
| SU | 1370079 A | 1/1988 |
| SU | 1806224 | 7/1991 |
| WO | WO0117901 | 3/2001 |

(Continued)

OTHER PUBLICATIONS

Inque et al., Crystallisation of Titania in Liquid Media at High Temperatures British Ceramic Transactions, vol. 97 (5) 222-226, 1998.

(Continued)

*Primary Examiner*—Steven Bos

(57) ABSTRACT

This invention pertains to a mesoporous oxide of hafnium and processes of making a mesoporous oxide of hafnium.

27 Claims, 6 Drawing Sheets

FOREIGN PATENT DOCUMENTS

| WO | WO01/81244 | 11/2001 |
| WO | WO02/12123 A1 | 2/2002 |
| WO | WO03/082742AE | 10/2003 |

OTHER PUBLICATIONS

Stephen Brunauer et al., Adsorption of Gases in Multimolecular Layers, J. Amer. Chem.Soc., vol. 60, 309, 1938.

E. P. Barrett et al., The Determination of Pore Volume and Area Distributions in Porous Substances. I Computations from Nitrogen Isotherms, J. Amer. Chem Soc. vol. 73, 373, 1951.

M.K. Nazeeruddin et al., Engineering of Efficient Panchromatic Sensitizers for Nanocrystalline TiO2—Based Solar Cells.

The International Search Report, US05/42817, Mar. 30, 2006.

M.C. Carbajo et al., Macroporous Silica and Titania Obtained Using Poly[Styrene-Co-(2-Hydroxyethyl Methacrylate)] As Template, J. Mater. Chem, 2002, 12, 2740-2746.

Chang-Wen Guo et al., Fabrication of High Surface Area Fibrous TiO2 with Well-Defined Mesostructures Via a Nonsurfactant Approach, the Chemical Society of Japan, 2002, 588-589.

Hiroshi Hirashima et al., Preparation of Meso-Porous TiO2 Gels and Their Characterization, Elsevier Scienc B.V., Journal of Non-Crystalline Solids 285 (2001) 96-100.

Miah Muhammed Yusuf et al, Preparation of Mesoporous TiO2 Thin Films by Surfactant Templating, Elsevier Science B.V., Journal of Non-Crystalline Solids, 285, (2001), 90-95.

Ki Chang Song et al., Control of Phase and Pore Structure of Titania Powders Using HC1 and NH4OH Catalysts, Journal of the American Ceramic Society (2001), 84(1), 92-98.

E. J. Kim et al., Microstructure and photoactivity of Titania Nanoparticles Prepared in Nonionic W/O Microemulsions, Materials Science and Engineering A 202 (2001) 24-29.

Ki Chang Song et al., The Effect of Alcohol Solvents on the Porosity and Phase Composition of Titania, Journal of Colloid and Interface Science (2002), 231 (2), 289-298.

Olaf Muth et al, On the Way to New Nanoporous Transition Metal Oxides, Studies in Surface Science and Catalysis (2000), 129, 357-366.

Jingzhe Zhao et al, The Preparation and Mechanism Studies of Porous Titania, Materials Chemistry and Physics 63 (2000) 9-12.

E. Sasaoka, et al, Novel Preparation Method of Macroporous Metal Oxides, Journal of Materials Science Letters (1999), 18 (7), 551-552.

Ulrike Ciesla et al., Ordered Mesoporous Materials, Microporous and Mesoporous Materials 27 (1999) 131-149.

David M. Antonelli, et al., Synthesis of Hexagonally Packed Mesoporous TiO2 by a modified Sol-Gel Method, Angew Chem Int. Ed Engl. 1995, 34, No. 18.

K.H. Ahmed et al, Consequences of Foreign Salt Additives on the Structure of Texture of Some Metal Oxides, Elsevier Science B.V., Colloids and Surfaces A: Physiocochemical and Engineering Aspects (1998), 136(3), 237-243.

H. Kominami et al, Synthesis of Thermally Stable Nanocrystalline Anatase by High-Temperature Hydrolysis of Titanium Alkoxide with Water Dissolved in Organic Solvent from Gas Phase, Journal of Materials Science Letters (1996), 15 (3), 197-200.

I.A. Montoya et al, On the Effects of the Sol-Gel Sysnthesis Parameters on Textural and Structural Characteristics of TiO2, Catalysis Letters (1992), 15 (1-2), 207-217.

Jehane Ragai et al., Origin of Porosity in Titania Gels. I. Microporous and Mesoporous Gels Prepared from Titanous Chloride and Ammonia, J. Chem. Tech. Biotechnol. 1980, 30, 1-6.

Cheng Wang et al., Synthesis of Nanocrystalline TiO2 in Alcohols, Powder Technology 125 (2002) 39-44.

Huiwen Liu et al., Crystallization of ZrO2(Y2O3 3% Mol) Nanoscale Powder Prepared by Precipitation, Chinese Science Bulletin, vol. 41, No. 12, (1996).

Huiwen Liu et al, Investigation of the Crystallization of ZrO2 (Y2O3 3 Mol%) Nanopowder, J. Mater. Res., vol. 11, No. 4 (1996).

Presentation on May 23, 2005 at the American Chemical Society Mid-Atlantic Regional Meeting, Rutgers University, NJ Charlie Torardi et al, "High Porosity TiO2 Via Inorganic-Salt Porogens".

Wang, et al., Titania from Nanoclusters to Nanowires and Nanoforks European Physical Journal D: Stomic, Molecular and Optical Physics (2003), 24 (1-3) 355-360.

Ryoji Takahashi et al, "Structural Study of Mesoporous Titania and Titanium-Stearic Acid Complex Prepared from Titanium Alkoxide" Journal of the Chemical Society, Faraday Transactions, Royal Society of Chemistry Cambridge, GB, vol. 94, No. 20, Oct. 21, 1998, XP000787675.

Adamski et al., "Synthesis of Nanostructured Tetragonal ZrO2 of Enhanced Thermal Stability", Nukleonika, National Center for Scientific, Tehnical and Economic Informa, PL, vol. 51, No. Suppl1, 2006 pp. S27-S33, XP008086405.

Cabrera S et al., "Enhanced Surface Area in Thermally Stable Pure Mesoporous TiO2" Solid State Sciences, Elsevier, Paris, FR, vol. 2, No. 5, 2000, pp. 513-518, XP001038378.

Kaneko E Y et al., "Characterization of the Porosity Developed in a New Titania-Alumina Catalyst Support Prepared by the Sol Gel Route" Journal of Applied Crystallography, Copenhagen, DK, vol. 36, 2002, pp. 469-472, XP008086390.

Kartini I et al, "A Two-Step Sol-Gel Method for Synthesis of Nanoporous TiO2" Journal of Nanoscience and Nanotechnology, American Scientific Publishers, US. vol. 4, No. 3, Mar. 2004, pp. 270-274, XP008086389.

European Search Report.

* cited by examiner

MESOPOROUS OXIDE OF HAFNIUM

CROSS REFERENCE TO RELATED APPLICATIONS

This application is a continuation-in-part of application Ser. No. 10/995,968, filed on Nov. 23, 2004 (now abandoned) which is incorporated hereinby reference in its entirety.

FIELD OF THE INVENTION

This invention pertains to a mesoporous oxide of hafnium and processes for making a mesoporous oxide of hafnium.

BACKGROUND

The control of particle microstructure is an important commercial activity, useful, for example, in catalysis, electronics, optics, photovoltaics, and energy absorption applications. Control of particle microstructure allows control of physical and electronic properties, and is critical in the development of new functionalized materials. As an example, synthesis of small particle, high surface area inorganic oxides allows good particle dispersion in polymer binder systems for uniform coatings with specific tailored properties, such as light absorption/transmittance, porosity, and durability. It is well known that products having attributes such as small particles, high-surface area, and high porosity (porosity being determined by pore volume and average pore diameter) can be commercially useful in many applications including, without limitation, as catalysts or catalyst supports.

Titanium dioxide is an important material because of its high refractive index and high scattering power for visible light, making it a good pigment in paints and coatings that require a high level of opaqueness. $TiO_2$ is also active as a photocatalyst in the decomposition of organic waste materials because it can strongly absorb ultraviolet light and channel the absorbed energy into oxidation-reduction reactions. If the $TiO_2$ particles are made very small, less than about 100 nm, and if the photoactivity is suppressed by coating the $TiO_2$ particles, transparent films and coatings can be made that offer UV protection. Therefore, $TiO_2$ is a versatile material with many existing, as well as potential, commercial applications.

Several processes have been reported that use titanium tetrachloride, $TiCl_4$, as a starting source of titanium. $TiCl_4$ dissolved in a solvent is neutralized with a base, such as $NH_4OH$ or NaOH, to precipitate a titanium-oxide solid that is washed to remove the salt byproducts, such as $NH_4Cl$ and NaCl. However, for the reaction between $TiCl_4$ dissolved in a solvent and $NH_4OH$, the inclusion of the salt byproducts, $NH_4Cl$, in the precipitated solid in order to control the physical properties of the titania product has not been known.

U.S. Pat. No. 6,444,189 describes an aqueous process for preparing titanium oxide particles using $TiCl_4$ and ammonum hydroxide followed by filtration and thorough washing of the precipitate to make a powder with a pore volume of 0.1 cc/g and pore size of 100 Å. Inoue et al. (British Ceramic Transactions 1998 Vol, 97 No. 5 p. 222) describe a procedure to make a washed amorphous $TiO_2$ gel by starting with $TiCl_4$ and a stoichiometric excess of $NH_4OH$ solution. Publication No. CN 1097400A reacts $TiCl_4$ with $NH_3$ gas in alcohol solution to precipitate $NH_4Cl$ salt, but the titanium product is an alkoxide. A hydrated $TiO_2$ is made by removing the $NH_4Cl$ and hydrolyzing the separated liquid with water.

SUMMARY OF THE INVENTION

The invention relates to a process for making a mesoporous oxide of titanium, zirconium or hafnium, comprising:
 precipitating an ionic porogen and a hydrolyzed compound comprising titanium, zirconium or hafnium; and
 removing the ionic porogen from the precipitate to recover a mesoporous oxide of titanium, zirconium or hafnium, the ionic porogen being in sufficient amount to produce (i) a mesoporous oxide of titanium having a pore volume of at least about 0.5 cc/g and an average pore diameter of at least about 200 Å, (ii) a mesoporous oxide of zirconium having a pore volume of at least about 0.25 cc/g and an average pore diameter of at least about 100 Å or (iii) a mesoporous oxide of hafnium having a pore volume of at least about 0.1 cc/g and an average pore diameter of at least about 100 Å.

In another embodiment, the invention relates to a process for making a mesoporous oxide of titanium, zirconium or hafnium, the process comprising:
 precipitating an ionic porogen and a hydrous oxide of titanium, zirconium or hafnium from a reaction mixture comprising a titanium, zirconium or hafnium starting material, a base and a solvent, wherein the titanium, zirconium or hafnium starting material or the solvent, or both, are a source of the anion for the ionic porogen and the base is the source of the cation for the ionic porogen; and
 removing the ionic porogen from the precipitate to recover (i) a mesoporous oxide of titanium having a pore volume of at least about 0.5 cc/g and an average pore diameter of at least about 200 Å, (ii) a mesoporous oxide of zirconium having a pore volume of at least about 0.25 cc/g and an average pore diameter of at least about 100 Å or (iii) a mesoporous oxide of hafnium having a pore volume of at least about 0.1 cc/g and an average pore diameter of at least about 100 Å.

In yet another embodiment the invention relates to a process for making a mesoporous oxide of titanium, zirconium or hafnium, the process comprising:
 forming a mixture of a solid hydrolyzed starting material comprising titanium, zirconium or hafnium and a liquid medium;
 adding a sufficient quantity of a halide salt to the mixture to saturate the liquid medium of the mixture;
 recovering the solid from the saturated liquid medium, the solid comprising a hydrolyzed intermediate comprising titanium, zirconium or hafnium having pores containing the saturated liquid medium; and
 removing the saturated liquid medium from the solid to recover (i) a mesoporous oxide of titanium having a pore volume of at least about 0.5 cc/g and an average pore diameter of at least about 200 Å, (ii) a mesoporous oxide of zirconium having a pore volume of at least about 0.25 cc/g and an average pore diameter of at least about 100 Å or (iii) a mesoporous oxide of hafnium having a pore volume of at least about 0.1 cc/g and an average pore diameter of at least about 100 Å.

In one particular embodiment, the composition of matter of this invention comprises a mesoporous oxide of titanium having a microstructure characterized by a surface area of at least about 70 $m^2/g$, a pore volume of least about 0.5 cc/g, and an average pore diameter of least about 200 Å; an oxide of zirconium having a microstructure characterized by a surface area at least about 70 $m^2/g$, a pore volume of at least about 0.25 cc/g, and an average pore diameter of at least about 100 Å and; an oxide of hafnium having a microstructure characterized by a surface area at least about 40 m²/g, a pore volume of at least about 0.1 cc/g, and an average pore diameter of at least about 100 Å.

In yet another embodiment, the invention relates to a process for making a mesoporous amorphous hydrous oxide of titanium, comprising:

precipitating an ionic porogen and a hydrolyzed starting material comprising titanium; and removing the ionic porogen from the precipitate to recover a mesoporous hydrous oxide of titanium, the ionic porogen being in sufficient amount to produce a mesoporous hydrous oxide of titanium having a surface area of at least about 400 m²/g and a pore volume of at least about 0.4 cc/g.

In another particular embodiment the invention relates to a mesoporous amorphous hydrous oxide of titanium having a microstructure characterized by a surface area of at least about 400 m²/g and a pore volume of at least about 0.4 cc/g.

In yet another embodiment, the invention relates to the use of the metal oxide product of the invention as a catalyst or catalyst support and a nanoparticle precursor. The metal oxide of this invention can be used in plastics, protective coatings, optical devices, electronic devices, photovoltaic cells or battery anodes, specifically, lithium-battery anodes.

DETAILED DESCRIPTION

The present invention is directed to a process for forming a mesoporous transition metal oxide of Group IVB of the Periodic Table of the Elements (CAS version). Specific Group IVB transition metal oxides are $TiO_2$, $ZrO_2$, or $HfO_2$.

As used herein, the term "mesoporous" means structures having an average pore diameter from about 20 upto and including about 800 Å (about 2 to about 80 nm).

Figure 5:
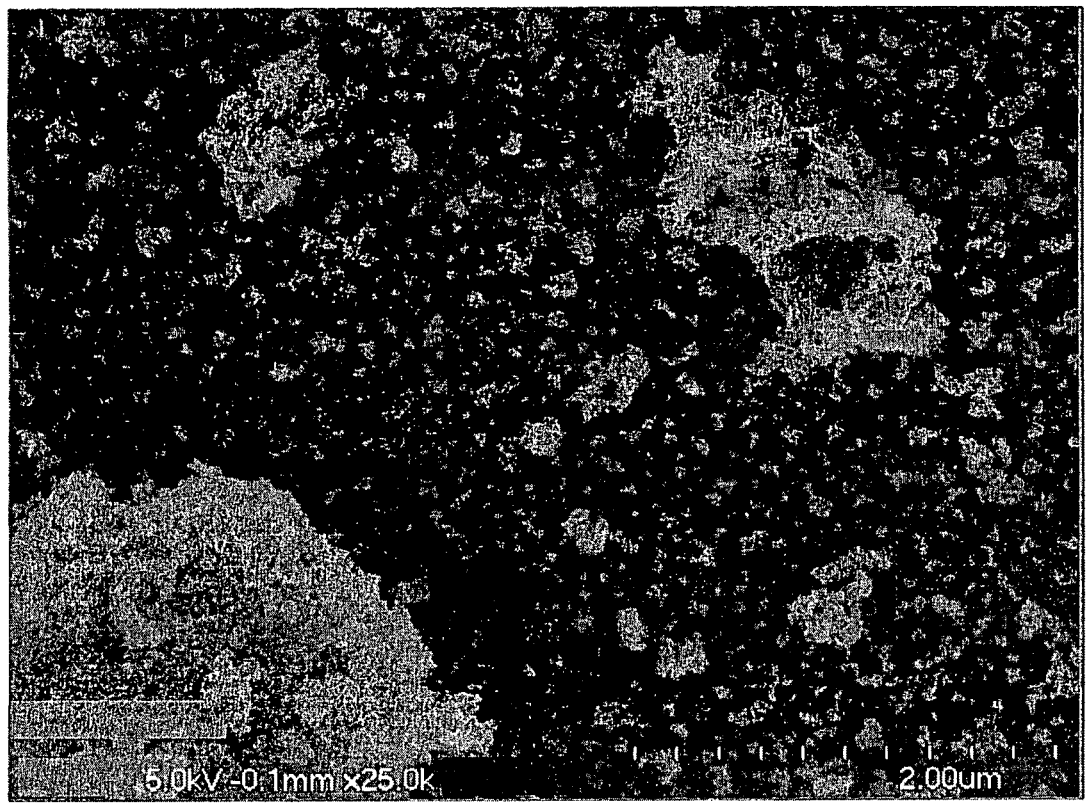
FIGS. 5 and 6 are scanning electron micrographs of the product formed in Example 5.

As best shown in FIG. 5, the microstructure product of this invention can be a sponge-like network of Group IVB metal oxide particles. As described herein, and as shown in the scanning electron micrographs of the Figures, the product of this invention comprises pores, the pores being interstices within an agglomerate of metal oxide particles and/or crystals.

Pore volumes and pore diameters referred to herein are determined by nitrogen porosimetry, and the surface areas are determined by BET.

The process of this invention uses a porogen. A porogen is a substance that can create porous structures by functioning as a template for the microstructure of the Group IVB metal oxide of this invention. The porogen can be removed to recover a mesoporous Group IVB metal oxide.

In one embodiment of the invention, the porogen is ionic. When the porogen is ionic it can be formed in situ from the Group IVB metal compound or the solvent, or both, and a base. The metal compound or the solvent can function as the source of the anion for the ionic porogen. The base can function as the source of the cation for the ionic porogen.

Alternatively, an ionic porogen can be added during the process, for example by addition of ammonium chloride to a mixture of a hydrolyzed compound comprising Ti, Zr or Hf and a liquid medium. When the process is a continuous one, the addition of the porogen to the mixture of hydrolyzed compound comprising Ti, Zr or Hf and liquid medium is done by any convenient method. When the process is a batch process, any method of adding one material to another can be used.

The ionic porogen can be a halide salt. Typically, the halide salt is an ammonium halide which can optionally contain lower alkyl groups. The lower alkyl groups can be the same or different and can contain from 1 upto and including about 8 carbon atoms, typically less than about 4 carbon atoms. Longer chain hydrocarbons for the alkyl group of the ammonium halide can be detrimental in making a calcined product because of charring; however, the longer chain hydrocarbons, typically over 4 up to and including about 10 carbon atoms, or even higher, would not be detrimental in making an amorphous product. Specific examples of ammonium halides containing lower alkyl groups include, without limitation, tetramethyl ammonium halide, and tetraethyl ammonium halide. The halide can be fluoride, chloride, bromide, or iodide. Even more specifically, the halide is chloride or bromide. The ionic porogen can be a combination of halide salts such as a combination of ammonium halide, tetramethyl ammonium halide and tetraethyl ammonium halide.

The porogen can be removed from the product of this invention to recover a mesoporous Group IVB metal oxide. Any suitable method for removing the porogen can be used. Contemplated methods for removing the porogen include washing, calcining, subliming and decomposing. It has been found that the choice of technique for removing the porogen depends upon whether a substantially or completely crystalline material is desired or whether an amorphous material is desired. When an amorphous material is desired the porogen can be removed by washing. When a crystalline material is desired the porogen can be removed by volatilizing, such as calcining.

A Group IVB metal starting material for the metal of the metal oxide is used. The Group IVB metal starting material can be a halide of a Group IVB metal or an oxyhalide of a Group IVB metal. Specific examples of useful Group IVB metal starting materials include titanium tetrachloride, titanium oxychloride, zirconium tetrachloride, zirconium oxychloride, such as $ZrOCl_2.8H_2O$, hafnium tetrachloride or hafnium oxychloride, such as $HfOCl_2.8H_2O$. The foregoing starting materials can be made by well known techniques. The oxychlorides can be made by mixing the metal tetrachloride with water. The Group IVB metal tetrachlorides and the zirconium and hafnium oxychlorides are commercially available. As known to those skilled in the art titanium tetrachloride dissolved in water forms a solution commonly referred to as titanium oxychloride.

It is believed that metal compounds containing organic groups will work in the process of this invention, however, a titanium alkoxide was found to form mesoporous metal oxides having a pore volume and an average pore diameter lower than preferred.

A hydrous metal oxide intermediate forms, from the starting material for the metal oxide, in the presence of base or aqueous solvent, depending upon the reaction mechanism.

A base can be used to precipitate the hydrous metal oxide intermediate. A base can also serve as the source of cations for the porogen. Suitable bases for the practice of the invention can include, without limitation thereto, $NH_4OH$, $(NH_4)_2CO_3$, $NH_4HCO_3$, $(CH_3)_4NOH$, $(CH_3CH_2)_4NOH$, or other base or mixture of bases that are removable from the product of the invention by washing or calcining. $NH_4OH$ is preferred.

In one embodiment of the invention, a solvent can be used in the process of this invention. A suitable solvent will depend upon the reaction mechanism, as discussed below. Solvents can be aqueous or organic, depending upon the Group IVB metal starting material. Suitable aqueous solvents include water (when additional salt is added as discussed below) or aqueous halide salt such as aqueous ammonium halide. Suitable organic solvents include lower alkyl group alcohols and dimethylacetamide. Lower alkyl group alcohols which have been found to be particularly useful in producing metal oxides of this invention typically have upto and including 3 carbon atoms. Specific examples of lower alkyl group alcohols include, without limitation, ethanol, isopropanol and n-propanol. A suitable solvent can also be the aqueous or organic solvent containing dissolved halide salt (e.g., ammonium halide), preferably a saturated solution of halide salt.

Solvents which have a low capacity to dissolve the porogen, such as aldehydes, ketones and amines, may also be suitable solvents. For example, without limitation thereto, in order for ammonium halide formed in situ to precipitate and act as a porogen, organic solvents having a low capacity to dissolve the ammonium halide or the saturated aqueous ammonium halide can be used.

Other examples of suitable solvents include, without limitation thereto, aqueous acid solutions, for example, an acid halide solution. Examples of acid halide solutions include, without limitation thereto, solutions of HCl, HBr or HF.

In general the suitability of a particular solvent or solvent system will depend upon the reactants, the porogen, the reaction mechanism and the desired porosity of the product.

The choice of solvent will depend upon the reaction mechanism and the porosity desired. When organic solvents are combined with aqueous reagents, such as 50 wt % $TiCl_4$ in water and concentrated $NH_4OH$, the resulting organic-water liquid portion of the reaction mixture will dissolve more of the porogen than would be dissolved in the organic solvent alone. However, under the conditions of this invention, enough undissolved porogen must remain to ultimately produce a high-porosity metal-oxide product. A solvent in which the metal starting material is soluble is typically used.

In a specific embodiment, high porosity titanium dioxide can be obtained by using a high level of precipitated ammonium chloride, which acts as the porogen. This can be accomplished by performing the acid-base reaction in a solvent system having limited ammonium-chloride solubility thereby precipitating more than about 50 wt % of the ammonium chloride, with precipitation of more than about 70 wt % being preferred, and precipitation of greater than about 90 wt % being most preferred.

In a specific embodiment of the invention, it has been found that using solvents with low $NH_4Cl$ solubility can yield $TiO_2$ having a high surface area, a pore volume of about 0.3 up to and including about 1.0 cc/g, and average pore diameter greater than about 300 Å.

A high water concentration in the reaction mixture will reduce pore volume by dissolving water soluble porogen, thereby leaving less precipitated porogen available for creating pores.

Water can be introduced to the process through the source of the metal or through the source of the base: for example, when the source of the metal is in an aqueous solution or when the base is in an aqueous solution.

It has been found that the solubility of ammonium halide in an organic-water combination or in saturated aqueous ammonium halide, and the influence of ammonium halide solubility on the porosity of the metal oxide can be affected by the form of the metal starting material. For example, $TiCl_4$ can be introduced neat and anhydrous, or it can be combined with water to make an aqueous solution which can be referred to as titanium oxychloride solution. For this titanium oxychloride solution, as the water:$TiCl_4$ weight ratio increases, ammonium halide solubility increases which will result in a decrease in product porosity. Similar results would be obtained for aqueous solutions of base as the water:base ratio increases.

Other solvent-specific factors can influence the pore volume of the metal oxide product; for example, different rates of precipitation of the porogen and the metal-oxide, and different rates of crystallization of the porogen and the metal oxide. These factors can impact the nature of the composite precipitate and the ability of the precipitated ammonium halide to produce the high porosity metal oxide product of this invention.

The concentration of the metal starting material can be in the range of about 0.01M to about 5.0 M, preferably about 0.05 to about 0.5 M. The metal starting material may in the form of a neat liquid or solid, or, preferably, as an aqueous or organic solution.

There are several ways in which the hydrolyzed metal compound and the porogen can be precipitated.

In one embodiment, a solvent is combined with the metal starting material to form a solution. The solvent-metal-halide solution is mixed with a base to precipitate the titanium and the porogen. For example without limitation thereto, in the synthesis of $TiO_2$, titanium chloride as the neat liquid, or as an aqueous solution such as 50 wt. % $TiCl_4$ in water based on the entire weight of the solution may be combined with the solvent. To the solvent-titanium-chloride solution so formed is added ammonium hydroxide to precipitate the hydrolyzed compound containing titanium and the porogen, ammonium chloride.

In another embodiment of the invention, a solvent is first combined with the base. The solvent-base mixture is combined with the metal starting material to form a precipitate of the metal and the porogen. For example without limitation thereto, in the synthesis of $TiO_2$, $NH_4OH$ may be combined with the solvent to form the solvent-base mixture which is combined with titanium chloride or titanium oxychloride to precipitate the hydrolyzed compound containing titanium and the porogen, ammonium chloride.

The porogen is then removed to form the mesoporous metal oxide product of the invention.

If the porogen is removed by washing with water, a very high surface area, high porosity, mesoporous network of amorphous or poorly crystalline, hydrous metal oxide remains. If the porogen is removed by calcining, a high surface area, high porosity, mesoporous network of metal oxide nanocrystals remains.

In another embodiment of the invention a sufficient quantity of a halide salt can be added, after precipitating the hydrolyzed metal oxide, to saturate the liquid medium. A solid recovered from the saturated liquid medium comprises a hydrolyzed metal compound having pores containing the saturated liquid medium. The saturated liquid medium is removed from the solid to recover the mesoporous Group IVB metal oxide.

Typically, the liquid medium is the liquid portion of the mixture of solvent, with or without dissolved salt, and hydrous metal oxide. As an example, without being limited thereto, a titanium starting material is combined with water to form a solution. To the solution so formed is added a base to form a mixture comprising precipitated hydrous metal oxide and liquid medium. To that mixture is added halide salt to saturate the liquid medium. Thereafter, the mesoporous product is recovered by removing the saturated liquid medium. Typically, this is accomplished by drying to volatilize the liquid and calcining to remove the porogen which remains after drying.

In general, after combining the starting materials, as described above, they can be mixed, preferably at room temperature, for less than one second upto several hours. Normally, mixing for 5-60 minutes will suffice. The precipitate can be recovered by any convenient method including settling, followed by decanting the supernatant liquid, filtration, centrifugation and so forth.

If a very high surface area hydrous metal oxide is desired, the recovered solid, however collected, can be slurried with fresh water to remove the porogen, optionally, followed by additional washing steps. The hydrous metal oxide recovered by washing the solid to remove the porogen is substantially or completely amorphous, as determined by X-ray powder diffraction, and has a very high surface area, typically at least about 400 $m^2/g$, typically in the range of about 400 to about 600 $m^2/g$. The pore volume of the amorphous hydrous metal oxide can be at least about 0.4 cc/g, typically in the range of about 0.4 to about 1.0. The number of washing steps required to achieve the desired level of hydrous metal oxide purity will depend upon the solubility of the porogen, the amount of water employed, and the efficiency of the mixing process. The recovered solid can be dried by any convenient means including but not limited to radiative warming and oven heating. As an example, a very high surface area, mesoporous hydrous oxide of titanium having a surface area of at least 400 $m^2/g$ and pore volume of at least about 0.4 cc/g may be synthesized using the process of this invention.

If a high surface area, mesoporous, nanocrystalline, metal oxide is desired, the hydrolyzed metal compound and porogen, however collected, can be calcined at a temperature that removes the porogen. Generally, the calcination temperatures are at least the sublimation or decomposition temperature of the porogen. Typically the calcination temperatures will range from about 300° C. to about 600° C., preferably between about 350° C. and about 550° C., and more preferably between about 400° C. and 500° C.

In the case of preparing $TiO_2$ from $TiCl_4$ and $NH_4OH$ in saturated aqueous ammonium chloride, the 450° C.-calcined product is composed of agglomerated nanocrystals of anatase, although some rutile, brookite, or X-ray amorphous material may also be present. The size of the anatase nanocrystals is a function of the calcination temperature and calcination time. At a calcination temperature of 450° C., the average crystallite size can be from about 10-15 nm.

The calcined $TiO_2$ made by the process of the invention is characterized by a combination of high surface area, high pore volume, and large average pore diameter. By high surface is meant at least about 70 $m^2/g$, high pore volume at least about 0.5 cc/g, preferably at least about 0.6 cc/g, and large average pore diameter at least about 200 Å, preferably at least about 300 Å. Generally, the pore volume will range from about 0.5 cc/g to about 1.00 cc/g, and the average pore diameter from about 200 Å to about 500 Å.

The crystalline titanium oxide product made by the process of this invention can comprise agglomerated nanocrystals predominantly, if not completely, having an anatase crystal structure. When the product is not completely anatase, a minor amount of rutile, brookite, and/or X-ray amorphous material may be present.

Calcined $ZrO_2$ made by the process of the invention is also characterized by a combination of high surface area, high pore volume, and large average pore diameter. For $ZrO_2$, the high surface is at least about 70 $m^2/g$, high pore volume at least about 0.25 cc/g, and large average pore diameter of at least about 100 Å, preferably at least about 150 Å. Generally, the pore volume for $ZrO_2$ thus formed is between about 0.25 cc/g and about 0.5 cc/g, and the average pore diameter is between about 100 Å and 200 Å.

Calcined $HfO_2$ made by the process of the invention is also characterized by a combination of high pore volume and large average pore diameter. For $HfO_2$, the high surface area is at least about 40 $m^2/g$, high pore volume at least about 0.1 cc/g, and large average pore diameter at least about 100 Å, preferably at least about 120 Å. Generally, the pore volume for $HfO_2$ is between about 0.1 cc/g and about 0.25 cc/g, and the average pore diameter is between about 100 Å and about 200 Å.

The process of the invention may be performed in both batch and continuous modes. The solvent can be separated and recycled. The volatiles can be condensed, then recycled or disposed.

The pH of the system is generally in the range of about 4 to about 10, preferably from about 5 to about 9, and most preferably between about 6 and about 8. In a continuous process, the pH of the system is generally controlled better than with a batch process because it is believed that the material produced is exposed to less environmental variability in pH.

In one embodiment of the invention the oxide of titanium, zirconium or hafnium further comprises a dopant which can be a transition metal, a Group IIA, IIIA, IVA, or VA metal. Specifically, without limitation thereto, the dopant can be Ge, P, As, Sb, Bi, Ni, Cu, Al, Zr, Hf, Si, Nb, Ta, Fe, Sn, Co, Zn, Mo, W, V, Cr, Mn, Mg, Ca, Sr, Ba, Ga, or In. Methods for incorporating dopants into the oxide would be apparent to those skilled in the art. For example, a dopant-containing compound could be added with the titanium, zirconium or hafnium-containing starting material.

Compositions of matter of this invention can be used as a catalyst or catalyst support. For example, the catalytic properties of $TiO_2$ are well known to those skilled in the catalyst art. Use of the compositions of matter of this invention as catalysts or catalyst supports would be apparent to those skilled in the catalyst art.

Compositions of matter of this invention can be used as nanoparticle precursors. The Group IVB metal oxide agglomerates formed by the process of this invention can be formed into nanoparticles by any suitable deagglomeration technique. As an example, product of this invention can be deagglomerated by combining the product with water and a suitable sufactant such as, without being limited thereto, tetrasodiumpyrophosphate followed by sonication to break-up the agglomerates. However, other suitable techniques for breaking-up the agglomerates would be apparent to those skilled in the metal oxide powder art. Typically, deagglomeration is by sonication or media milling. The nanoparticle precursor of the invention can be deagglomerated to a degree sufficient to form agglomerates considered to fall within the nanoparticle size range, typically having an average agglomerate size diameter which is less than about 200 nanometers.

The deagglomerated titanium dioxide product of this invention, if photo passivated, can be especially useful for UV light degradation resistance in plastics, sunscreens and other protective coatings including paints and stains.

The titanium dioxide product of this invention can be photo passivated by treatment with silica and/or alumina by any of several methods which are well known in the art including, without limit, silica and/or alumina wet treatments used for treating pigment-sized titanium dioxide.

The titanium dioxide product of this invention can also have an organic coating which may be applied using techniques known by those skilled in the art. A wide variety of organic coatings are known. Organic coatings employed for pigment-sized titanium dioxide may be utilized. Examples of organic coatings that are well known to those skilled in the art include fatty acids, such as stearic acid; fatty acid esters; fatty alcohols, such as stearyl alcohol; polyols such as trimethylpropane diol or trimethyl pentane diol; acrylic monomers, oligomers and polymers; and silicones, such as polydimethylsiloxane and reactive silicones such as methylhydroxysiloxane.

Organic coating agents can include but are not limited to carboxylic acids such as adipic acid, terephthalic acid, lauric acid, myristic acid, palmitic acid, stearic acid, oleic acid, salicylic acid, malic acid, maleic acid, and esters, fatty acid esters, fatty alcohols, such as stearyl alcohol, or salts thereof, polyols such as trimethylpropane diol or trimethyl pentane diol; acrylic monomers, oligomers and polymers. In addition, silicon-containing compounds are also of utility. Examples of silicon compounds include but are not limited to a silicate or organic silane or siloxane including silicate, organoalkoxysilane, aminosilane, epoxysilane, and mercaptosilane such as hexyltrimethoxysilane, octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane, N-(2-aminoethyl)3-aminopropylmethyl dimethoxysilane, N-(2-aminoethyl)3-aminopropyl trimethoxysilane, 3-aminopropyl triethoxysilane, 3-glycidoxypropyl trimethoxysilane, 3-glycidoxypropyl methyldimethoxysilane, 3-mercaptopropyl trimethoxysilane and combinations of two or more thereof. Polydimethylsiloxane and reactive silicones such as methylhydroxysiloxane may also be useful.

The titanium dioxide product of this invention may also be coated with a silane having the formula:

$$R_xSi(R')_{4-x}$$

wherein

R is a nonhydrolyzable aliphatic, cycloaliphatic or aromatic group having at least 1 to about 20 carbon atoms;

R' is a hydrolyzable group such as an alkoxy, halogen, acetoxy or hydroxy or mixtures thereof; and x=1 to 3.

For example, silanes useful in carrying out the invention include hexyltrimethoxysilane, octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane and octadecyltriethoxysilane. Additional examples of silanes include, R=8-18 carbon atoms; R'=chloro, methoxy, hydroxy or mixtures thereof; and x=1 to 3. Preferred silanes are R=8-18 carbon atoms; R'=ethoxy; and x=1 to 3. Mixtures of silanes are contemplated equivalents. The weight content of the treating agent, based on total treated particles can range from about 0.1 to about 10 wt. %, additionally about 0.7 to about 7.0 wt. % and additionally from about 0.5 to about 5 wt %.

The titanium dioxide particles of this invention can be silanized as described in U.S. Pat. Nos. 5,889,090; 5,607,994; 5,631,310; and 5,959,004 which are each incorporated by reference herein in their entireties.

The titanium dioxide product of this invention may be treated to have any one or more of the foregoing organic coatings.

Titanium dioxide product made according to the present invention may be used with advantage in various applications including without limitation, coating formulations such as sunscreens, cosmetics, automotive coatings, wood coatings, and other surface coatings; chemical mechanical planarization products; catalyst products; photovoltaic cells; plastic parts, films, and resin systems including agricultural films, food packaging films, molded automotive plastic parts, and engineering polymer resins; rubber based products including silicone rubbers; textile fibers, woven and nonwoven applications including polyamide, polyaramid, and polyimides fibers products and nonwoven sheets products; ceramics; glass products including architectural glass, automotive safety glass, and industrial glass; electronic components; and other uses in which photo and chemically passivated titanium dioxide will be useful.

Thus in one embodiment, the invention is directed to a coating composition suitable for protection against ultraviolet light comprising an additive amount suitable for imparting protection against ultraviolet light of photo passivated titanium dioxide nanoparticles made in accordance with this invention dispersed in a protective coating formulation.

One area of increasing demand for titanium dioxide nanoparticles is in cosmetic formulations, particularly in sunscreens as a sunscreen agent. Titanium dioxide nanoparticles provide protection from the harmful ultraviolet rays of the sun (UV A and UV B radiation).

A dispersant is usually required to effectively disperse titanium dioxide nanoparticles in a fluid medium. Careful selection of dispersants is important. Typical dispersants for use with titanium dioxide nanoparticles include aliphatic alcohols, saturated fatty acids and fatty acid amines.

The titanium dioxide nanoparticles of this invention can be incorporated into a sunscreen formulation. Typically the amount of titanium dioxide nanoparticles can be up to and including about 25 wt. %, typically from about 0.1 wt. % up to and including about 15 wt. %, even more preferably up to and including about 6 wt. %, based on the weight of the formulation, the amount depending upon the desired sun protection factor (SPF) of the formulation. The sunscreen formulations are usually an emulsion and the oil phase of the emulsion typically contains the UV active ingredients such as the titanium dioxide particles of this invention. Sunscreen formulations typically contain in addition to water, emollients, humectants, thickeners, UV actives, chelating agents, emulsifiers, suspending agents (typically if using particulate UV actives), waterproofers, film forming agents and preservatives.

Specific examples of preservatives include parabens. Specific examples of emollients include octyl palmitate, cetearyl alcohol, and dimethicone. Specific examples of humectants include propylene glycol, glycerin, and butylene glycol. Specific examples of thickeners include xanthan gum, magnesium aluminum silicate, cellulose gum, and hydrogenated castor oil. Specific examples of chelating agents include disodium ethylene diaminetetraacetic acid (EDTA) and tetrasodium EDTA. Specific examples of UV actives include ethylhexyl methoxycinnamate, octocrylene, and titanium dioxide. Specific examples of emulsifiers include glyceryl stearate, polyethyleneglycol-100 stearate, and ceteareth-20. Specific examples of suspending agents include diethanolamine-oleth-3-phosphate and neopentyl glycol dioctanoate. Specific examples of waterproofers include C30-38 olefin/isopropyl maleate/MA copolymer. Specific examples of film forming agents include hydroxyethyl cellulose and sodium carbomer.

To facilitate use by the customer, producers of titanium dioxide nanoparticles may prepare and provide dispersions of the particles in a fluid medium which are easier to incorporate into formulations.

Water based wood coatings, especially colored transparent and clear coatings benefit from a UV stabilizer which protects the wood. Organic UV absorbers are typically hydroxybenzophenones and hydroxyphenyl benzotriazoles. A commercially available UV absorber is sold under the trade name Tinuvin™ by Ciba. These organic materials, however, have a short life and decompose on exterior exposure. Replacing some or all of the organic material with titanium dioxide nanoparticles would allow very long lasting UV protection. Photo passivated titanium dioxide of this invention may be used to prevent the titanium dioxide from oxidizing the polymer in the wood coating, and be sufficiently transparent so the desired wood color can be seen. Because most wood coatings are water based, the titanium dioxide needs to be dispersible in the water phase. Various organic surfactants known in the art can be used to disperse the titanium dioxide nanoparticles in water.

Many cars are now coated with a clear layer of polymer coating to protect the underlying color coat, and ultimately the metal body parts. This layer has organic UV protectors, and like wood coatings, a more permanent replacement for these materials is desired. The clear coat layers are normally solvent based, but can also be water based. Such coatings are well known in the art. The titanium dioxide nanoparticles of this invention can be modified for either solvent or water based systems with appropriate surfactants or organic surface treatments.

When treated for reduced photo activity, the titanium dioxide particles of this invention can be beneficial in products which degrade upon exposure to UV light energy such as thermoplastics and surface coatings.

Titanium dioxide nanoparticles can also be used to increase the mechanical strength of thermoplastic composites. Most of these applications also require a high degree of transparency and passivation so underlying color or patterns are visible and the plastic is not degraded by the photoactivity of the titanium dioxide nanoparticles. The titanium dioxide nanoparticles must be compatible with the plastic and easily compounded into it. This application typically employs organic surface modification of the titanium dioxide nanoparticles as described herein above. The foregoing thermoplastic composites are well known in the art.

Polymers which are suitable as thermoplastic materials for use in the present invention include, by way of example but not limited thereto, polymers of ethylenically unsaturated monomers including olefins such as polyethylene, polypropylene, polybutylene, and copolymers of ethylene with higher olefins such as alpha olefins containing 4 to 10 carbon atoms or vinyl acetate, etc.; vinyls such as polyvinyl chloride, polyvinyl esters such as polyvinyl acetate, polystyrene, acrylic homopolymers and copolymers; phenolics; alkyds; amino resins; epoxy resins, polyamides, polyurethanes; phenoxy resins, polysulfones; polycarbonates; polyether and chlorinated polyesters; polyethers; acetal resins; polyimides; and polyoxyethylenes. The polymers according to the present invention also include various rubbers and/or elastomers either natural or synthetic polymers based on copolymerization, grafting, or physical blending of various diene monomers with the above-mentioned polymers, all as generally well known in the art. Thus generally, the present invention is useful for any plastic or elastomeric compositions (which can also be pigmented with pigmentary $TiO_2$). For example, but not by way of limitation, the invention is felt to be particularly useful for polyolefins such as polyethylene and polypropylene, polyvinyl chloride, polyamides and polyester.

From the refractive index of compositions of matter of this invention it would be apparent to those skilled in the optics art that the compositions of this invention can be useful in optics. The $TiO_2$ product of this invention could be combined with polymethylmethacrylate polymer and made into an optical device. Other techniques for incorporating the compositions of this invention into optical devices would be apparent to those skilled in the art of making optical devices.

Additionally, compositions of matter of this invention can be useful in electronics. For example the $TiO_2$ product of this invention could be used in photovoltaic devices. As an example, a $TiO_2$ product can be combined with a binder and cast into a film on a conducting substrate by well-known techniques to form a component of an anode which can be used in a solar cell. Other suitable techniques for incorporating products of this invention into photovoltaic devices would be apparent to those skilled in the electronics art. $TiO_2$ products of this invention can provide high powder conversion efficiency in solar cell applications.

Compositions of matter of this invention can be used in a battery as a major component of the anode. For example, the electrochemical properties of titanium in a lithium battery are well known to those skilled in the battery art and the titanium dioxide product of this invention can be used in making an anode of a battery by techniques known to those skilled in the battery art.

In one embodiment, the invention herein can be construed as excluding any element or process step that does not materially affect the basic and novel characteristics of the composition or process. Additionally, the invention can be construed as excluding any element or process step not specified herein.

Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The examples which follow, description of illustrative and preferred embodiments of the present invention are not intended to limit the scope of the invention. Various modifications, alternative constructions and equivalents may be employed without departing from the true spirit and scope of the appended claims.

Test Methods

The following test methods and procedures were used in the Examples below:

Nitrogen Porosimetry: Dinitrogen adsorption/desorption measurements were performed at 77.3 K on Micromeritics ASAP model 2400/2405 porosimeters (Micromeritics Inc., One Micromeritics Drive, Norcross Ga. 30093-1877). Samples were degassed at 150° C. overnight prior to data collection. Surface area measurements utilized a five-point adsorption isotherm collected over 0.05 to 0.20 p/p₀ and analyzed via the BET method (described in S. Brunauer, P. H. Emmett and E. Teller, *J. Amer. Chem. Soc.*, 60, 309 (1938) ). Pore volume distributions utilized a 27 point desorption isotherm and were analyzed via the BJH method (described in E. P. Barret, L. G. Joyner and P. P. Halenda, *J. Amer. Chem. Soc.*, 73, 373 (1951)). Values for pore volume represent the single point total pore volume of pores less than about 3000 angstroms. Average pore diameter, D, is determined by $D=4V/A$, where V is the single point total pore volume and A is the BET surface area.

X-ray Powder Diffraction: Room-temperature powder x-ray diffraction data were obtained with a Philips X'PERT automated powder diffractometer, Model 3040. Samples were run in batch mode with a Model PW 1775 or Model PW 3065 multi-position sample changer. The diffractometer was equipped with an automatic variable slit, a xenon proportional counter, and a graphite monochromator. The radiation was CuK(alpha) (45 kV, 40 mA). Data were collected from 2 to 60 degrees 2-theta; a continuous scan with an equivalent step size of 0.03 deg; and a count time of 0.5 seconds per step.

Thermogravimetric Analysis: About 5-20 mg samples were loaded into platinum TGA pans. Samples were heated in a TA Instruments 2950 TGA under 60 ml/min air purge and 40 ml/min $N_2$ in the balance area (total purge rate was 100 ml/min). Samples were heated from RT to 800° C. at 10° C./min. The temperature scale of the TGA was previously calibrated at the 10° C./min rate using thermomagnetic standards.

Ionic Conductivity: Ionic conductivity was measured with a VWR traceable conductivity/resistivity/salinity concentration meter. The ionic conductivity of the wash solutions was used to determine when the majority of the $NH_4Cl$ salt had been removed.

Particle Size Distribution (PSD): Particle size distribution was measured with a Malvern Nanosizer Dynamic Light Scattering Unit on suspensions containing 0.1 wt % $TiO_2$.

Index of Refraction: The index of refraction of samples was measured with a Metricon Prism Coupler, Model 2010, with four wavelengths available (633, 980, 1310 and 1550 nm). This instrument interprets the amount of light coupled into a sample that is pressed into contact with a high index prism. The light enters the sample from the prism side and the angle of incidence is varied. The wavelength selected in the examples below was 1550 nm. The sample was placed against the prism and held in close optical contact with the prism by a pneumatic ram. The sample surface was flat, smooth and clean, and of uniform thickness. The aligned laser light hit the optically contacted spot between the sample and the prism, and the index of refraction was obtained from a plot of intensity versus angle of incidence.

Photo Voltaic Power Efficiency: Photo voltaic power efficiency ("PVPE") was measured using photoelectrochemical techniques as described in section 2.5 of M. K. Nazeeruddin, et al., *J. Am. Chem. Soc.*, Vol. 123, pp. 1613-1624, 2001. Data were obtained by using a 450 W xenon light source that was focused to give 1000 W/m², at the surface of the test cell, and measuring the output with a digital source meter. The information was analyzed after data acquisition.

EXAMPLES

In the following Examples and Comparative Examples, reaction products of a Group IVB metals were formed and characterized. Surface area and porosity data are summarized in Table 6 and were obtained by the procedures described above.

All chemicals and reagents were used as received from:

| | |
|---|---|
| $TiCl_4$ | Aldrich Chemical Co., Milwaukee, WI, 99.9% |
| $ZrOCl_2 \cdot 8H_2O$ | Alfa Aesar, Ward Hill, MA, 99.9% |
| $HfOCl_2 \cdot 8H_2O$ | Alfa Aesar, Ward Hill, MA, 99.98% |
| ethanol | Pharmco, Brookfield, CT, ACS/USP Grade 200 Proof |
| $NH_4OH$ | EMD Chemicals, Gibbstown, NJ, 28.0–30.0% |
| $NH_4Cl$ | EMD Chemicals, Gibbstown, NJ, 99.5% |
| n-propanol | EMD Chemicals, Gibbstown, NJ, 99.99% |
| isopropanol | EMD Chemicals, Gibbstown, NJ, 99.5% |
| n-butanol | EMD Chemicals, Gibbstown, NJ, 99.97% |
| iso-butanol | EMD Chemicals, Gibbstown, NJ, 99.0% |
| tert-butanol | EMD Chemicals, Gibbstown, NJ, 99.0% |
| DMAc | EMD Chemicals, Gibbstown, NJ, 99.9% (N,N' dimethylacetamide) |
| acetone | EMD Chemicals, Gibbstown, NJ, 99.5% (reagent bottle) |
| $TiO_2$ | Degussa Inc., Parsipanny, NJ, P25 |
| TSPP | tetrasodiumpyrophosphate (CAS number 7722-88-5) |

All references herein to elements of the Periodic Table of the Elements are to the CAS version of the Periodic Table of the Elements.

In Comparative Examples A, B, C, D, and in Examples 1-5, 7-9 and 11, the amount of 50 wt. % $TiCl_4$ in water is the source of titanium oxychloride.

Comparative Example A

This example illustrates that reaction of titanium oxychloride and $NH_4OH$ in water alone does not produce a $TiO_2$ product, uncalcined or calcined, having the surface area and porosity properties of $TiO_2$ made by processes of this invention. The precipitate formed from the reaction of titanium oxychloride and $NH_4OH$ in water is washed extensively to remove any trapped $NH_4Cl$ byproduct.

20.0 g (14 mL) of 50 wt. % $TiCl_4$ in water were added to about 200 mL deionized water while stirring with a Teflon coated magnetic stirring bar in a 400 mL Pyrex beaker. With stirring, 14.5 mL concentrated $NH_4OH$ (i.e., ~30% wt=14.8 M) were added to the titanium solution. The pH of the slurry, measured with multi-color strip pH paper, was about 7. The resulting slurry was stirred for 60 minutes at ambient temperature.

The solid was washed extensively with deionized water until the clear, colorless supernatant wash water had a low ionic conductivity value, 12 μS/cm. The solid was collected by suction filtration and dried under an IR heat lamp. An X-ray powder diffraction pattern showed the material to be amorphous. Nitrogen porosimetry measurements of this uncalcined powder revealed a surface area of 398 m²/g, a pore volume of 0.37 cc/g, and an average pore diameter of 37 Å.

The powder was transferred to an alumina crucible and heated uncovered from room temperature to 450° C. over the period of one hour, and held at 450° C. for an additional hour. The crucible and its contents were removed from the furnace and cooled naturally to room temperature.

Figure 1:
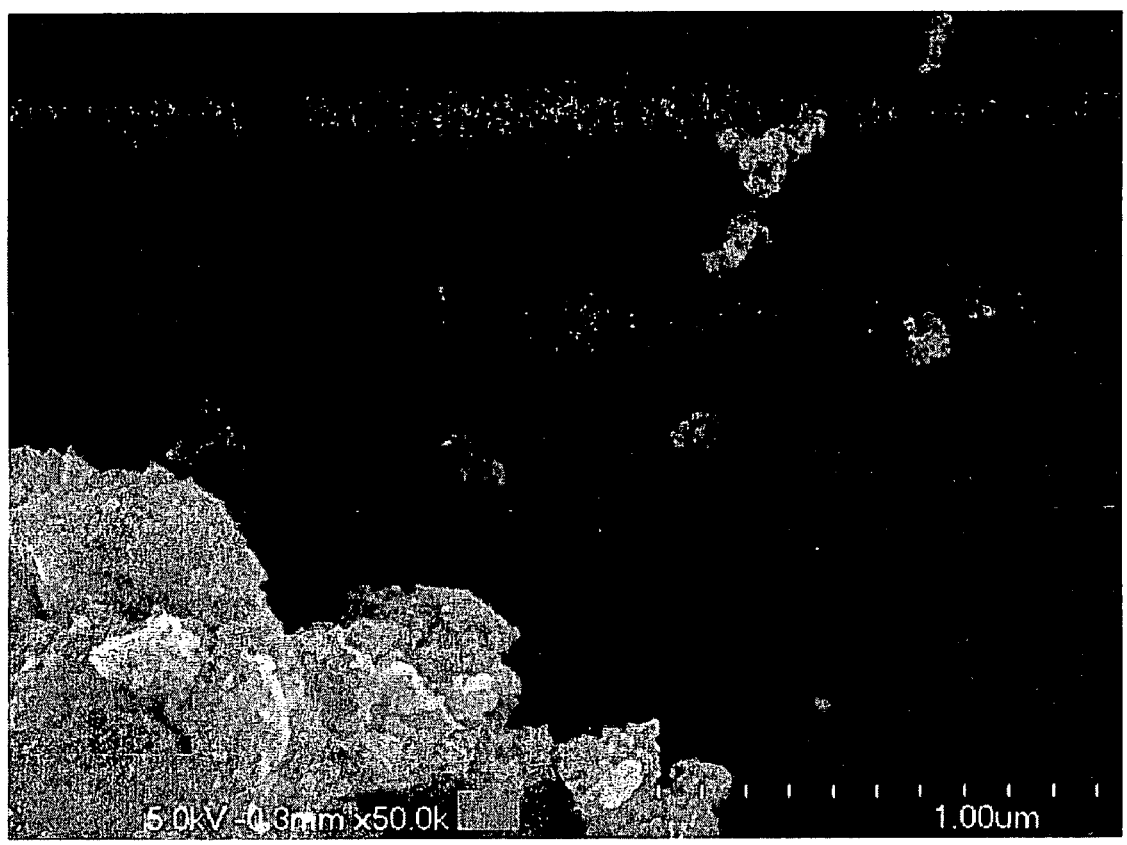
FIG. 1 depicts a scanning electron microscope (SEM) image of calcined powder of Comparative Example A.

An X-ray powder diffraction pattern of the calcined material showed only the broad lines of anatase indicating an average crystal size of 16 nm. Nitrogen porosimetry revealed a surface area of 72 m²/g, a pore volume of 0.17 cc/g, and an average pore diameter of 95 Å. FIG. 1 is a scanning electron microscope (SEM) image of the calcined powder, at a magnification of 50,000×, showing the product is compacted with low porosity. The porosimetry data of this Example are reported in Table 6.

Comparative Example B

This example also illustrates that reaction of titanium oxychloride and $NH_4OH$ in water alone does not produce a $TiO_2$ product, uncalcined or calcined, having the surface area and porosity properties of a $TiO_2$ product of this invention. Here, the precipitate formed from the reaction of titanium oxychloride and $NH_4OH$ in water is collected and processed without the washing step used in Comparative Example A to remove $NH_4Cl$ byproduct.

20.0 g (14 mL) of 50 wt. % $TiCl_4$ in water were added to about 200 mL deionized water while stirring with a Teflon coated magnetic stirring bar in a 400 mL Pyrex beaker. With stirring, 28 mL 1:1 $NH_4OH$ (i.e., 14-15% wt=7.5 M) were added to the titanium solution. The pH of the slurry, measured with multi-color strip pH paper, was about 5. The resulting slurry was stirred for 60 minutes at ambient temperature.

The unwashed solid was collected by suction filtration and dried under an IR heat lamp. An X-ray powder diffraction pattern showed the lines of $NH_4Cl$ and a trace of anatase. Nitrogen porosimetry measurements of this mixture revealed a surface area of 215 $m^2/g$, a pore volume of 0.17 cc/g, and an average pore diameter of 31 Å.

The powder was transferred to an alumina crucible and heated uncovered from room temperature to 450° C. over the period of one hour, and held at 450° C. for an additional hour. The crucible and its contents were removed from the furnace and cooled naturally to room temperature.

An X-ray powder diffraction pattern of the calcined material showed broad lines of anatase as the most intense and also showed one line of brookite with very low intensity. Nitrogen porosimetry revealed a surface area of 70 $m^2/g$, a pore volume of 0.25 cc/g, and an average pore diameter of 146 Å. The porosimetry data of this Example are reported in Table 6.

Comparative Example C

This example illustrates that reaction of titanium oxychloride and $NH_4OH$ using acetone as the solvent does not result in a calcined $TiO_2$ having the surface area and porosity properties of a calcined $TiO_2$ product made by the process of this invention.

20.0 g (14 mL) of 50 wt. % $TiCl_4$ in water were added to about 200 mL acetone while stirring with a Teflon coated magnetic stirring bar in a 400 mL Pyrex beaker. With stirring, 28 mL 1:1 $NH_4OH$ (i.e., 14-15% wt=7.5 M) were added to the titanium solution. The pH of the slurry, measured with water moistened multi-color strip pH paper, was about 7. The resulting slurry was stirred for 60 minutes at ambient temperature.

The solid was collected by suction filtration and dried under an IR heat lamp to yield 14.5 g of white powder. An X-ray powder diffraction pattern showed only the lines of $NH_4Cl$.

The powder was transferred to an alumina crucible and heated uncovered from room temperature to 450° C. over the period of one hour, and held at 450° C. for an additional hour. The crucible and its contents were removed from the furnace and cooled naturally to room temperature. It was observed that the volume of powder after calcination was about half the volume of the starting precalcined powder.

An X-ray powder diffraction pattern of the calcined material showed broad lines of anatase as the most intense, and also showed some lines of rutile with very low intensity, as well as some amorphous material. Nitrogen porosimetry revealed a surface area of 75.8 $m^2/g$, a pore volume of 0.24 cc/g, and an average pore diameter of 129 Å. The porosimetry data of this Example are reported in Table 6.

Comparative Example D

This example describes that reaction of titanium oxychloride and $NH_4OH$ in the three butanol isomers to form $TiO_2$.

20.0 g (14 mL) of 50 wt. % $TiCl_4$ in water were added to about 200 mL n-butanol, tert-butyl alcohol, and isobutyl alcohol, respectively, while stirring with a Teflon coated magnetic stirring bar in 400 mL Pyrex beakers. With stirring, 29 mL 1:1 $NH_4OH$ (i.e., 14-15% wt=7.5 M) were added to each of the three titanium solutions. The pH of the slurries was measured with water moistened multi-color strip pH paper and observed to be in the range of ~6-7. The slurries were stirred for 60 minutes at ambient temperature.

The solids were each collected by suction filtration and dried under an IR heat lamp to give yields of 14.7 g, 13.3 g, and 13.1 g, respectively. X-ray powder diffraction patterns showed only the lines of $NH_4Cl$ for the n-butanol and tert-butyl alcohol reactions, and a trace of anatase in addition to $NH_4Cl$ for the isobutyl alcohol reaction.

The powders were transferred to alumina crucibles and heated, uncovered, from room temperature to 450° C. over the period of one hour, and held at 450° C. for an additional hour. The crucibles and their contents were removed from the furnace and cooled naturally to room temperature. X-ray powder diffraction patterns of the calcined materials showed the crystalline phases reported in Table 1:

TABLE 1

| Butanol solvent | Crystalline phases determined by XPD |
|---|---|
| n-butanol | anatase, trace of brookite |
| tert-butyl alcohol | anatase |
| isobutyl alcohol | anatase, $NH_4Cl$, small amount of rutile |

Nitrogen porosimetry revealed the following surface areas, pore volumes, and average pore diameters reported in Table 2:

TABLE 2

| | surface area ($m^2/g$) | pore vol. (cc/g) | ave. pore diam. (Å) |
|---|---|---|---|
| (I) n-butanol | 82 | 0.4 | 193 |
| (II) tert-butyl alcohol | 74 | 0.37 | 202 |
| (III) isobutyl alcohol | 109 | 0.28 | 105 |

As shown in Table 2, the $TiO_2$ product formed in accordance with the procedure of this Comparative Example D, wherein the solvent was each of the three different butanol isomers, did not have the porosity properties of $TiO_2$ produced by the process of this invention. The porosimetry data of this Example are also reported in Table 6.

Example 1

This example illustrates that reaction of titanium oxychloride and $NH_4OH$ in aqueous saturated $NH_4Cl$ can produce a calcined mesoporous nanocrystalline $TiO_2$ powder having a high surface area and high porosity.

20.0 g (14 mL) of 50 wt. % $TiCl_4$ in water were added to about 250 mL aqueous $NH_4Cl$ solution, made by dissolving 73 g $NH_4Cl$ in 200 g deionized $H_2O$, with stirring with a Teflon coated magnetic stirring bar in a 400 mL Pyrex beaker. With continued stirring, 30 mL 1:1 $NH_4OH$ (i.e., 14-15% wt or 7.5 M) were added to the titanium-chloride/ammonium chloride solution. The pH of the slurry, measured with multi-color strip pH paper, was about 7. The resulting slurry was stirred for 60 minutes at ambient temperature.

The solid was collected by suction filtration and dried under an IR heat lamp to yield 14.9 g of white powder. The powder was then transferred to an alumina crucible and heated uncovered from room temperature to 450° C. over the period of one hour, and held at 450° C. for an additional hour to ensure removal of the volatile $NH_4Cl$. The crucible and its contents were removed from the furnace and cooled naturally to room temperature.

Figure 2:
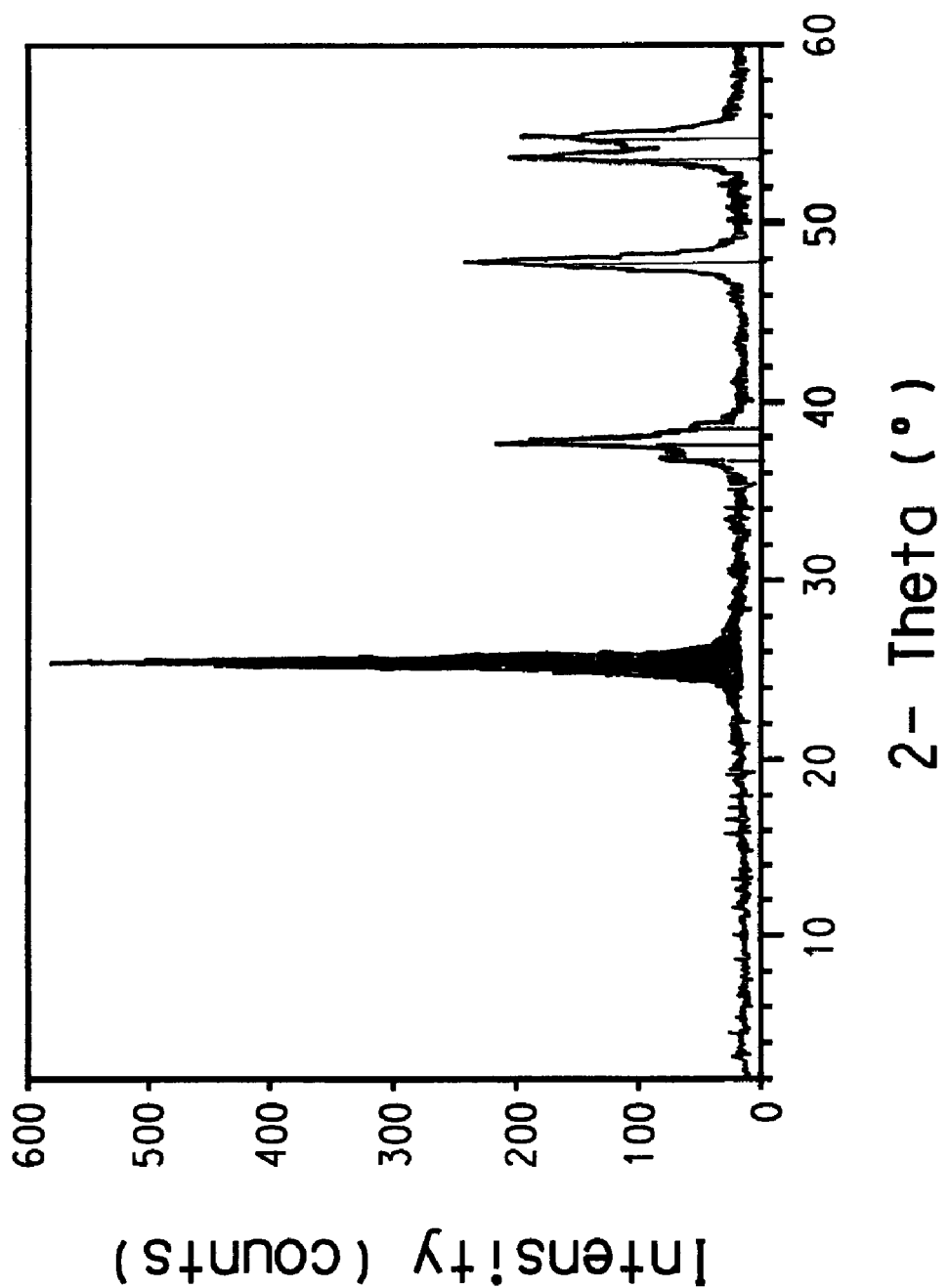
FIG. 2 depicts the X-ray powder diffraction pattern of the a product of the process to make $TiO_2$ using $TiCl_4$ and $NH_4OH$ in aqueous saturated $NH_4Cl$ as described in Example 1.

An X-ray powder diffraction pattern of the calcined material showed only broad lines of anatase and from the width of the strongest peak an average crystal size of 12 nm was estimated (see FIG. 2). Nitrogen porosimetry revealed a surface area of 88 $m^2/g$, a pore volume of 0.72 cc/g, and an average pore diameter of 325 Å. The porosimetry data of this Example are reported in Table 6.

Example 2

This example illustrates that reaction of titanium oxychloride and $NH_4OH$ in absolute ethanol can produce a calcined mesoporous nanocrystalline $TiO_2$ powder having a high surface area and high porosity.

15 mL concentrated $NH_4OH$ were added to about 200 mL absolute ethanol while stirring with a Teflon coated magnetic stirring bar in a 400 mL Pyrex beaker. With stirring, 20.0 g (14 mL) of 50 wt. % $TiCl_4$ in water were added to the basic solution. The pH of the slurry, measured with water moistened multi-color strip pH paper, was about 8. The resulting slurry was stirred for 60 minutes at ambient temperature.

The solid was collected by suction filtration and dried under an IR heat lamp. The powder was transferred to an alumina boat and heated uncovered from room temperature to 450° C. over the period of one hour, and held at 450° C. for an additional hour. The furnace with the boat and its contents were cooled naturally to room temperature. An X-ray powder diffraction pattern of the calcined material showed only the broad lines of anatase. Nitrogen porosimetry revealed a surface area of 84 $m^2/g$, a pore volume of 0.78 cc/g, and an average pore diameter of 371 Å. The porosimetry data of this Example are reported in Table 6.

Example 3

This example illustrates that adding $NH_4OH$ to a solution of titanium oxychloride in n-propanol can produce a calcined mesoporous nanocrystalline $TiO_2$ powder having a high surface area and high porosity.

20.0 g (14 mL) of 50 wt. % $TiCl_4$ in water were added to about 200 mL n-propanol while stirring with a Teflon coated magnetic stirring bar in a 400 mL Pyrex beaker. With stirring, 28 mL 1:1 $NH_4OH$ (i.e., 14-15% wt or 7.5 M) were added to the titanium solution. The pH of the slurry, measured with water moistened multi-color strip pH paper, was about 6. The resulting slurry was stirred for 60 minutes at ambient temperature.

The solid was collected by suction filtration and dried under an IR heat lamp to yield 13.0 g of white powder. An X-ray powder diffraction pattern showed only the lines of $NH_4Cl$. The powder was transferred to an alumina crucible and heated uncovered from room temperature to 450° C. over the period of one hour, and held at 450° C. for an additional hour to ensure removal of the volatile $NH_4Cl$. The crucible and its contents were removed from the furnace and cooled naturally to room temperature. Surprisingly, the volume of powder after calcination was almost the same as that of the starting pre-calcined powder, even though the amount of $NH_4Cl$ in the starting mixture was ~65% by weight.

Figure 3:
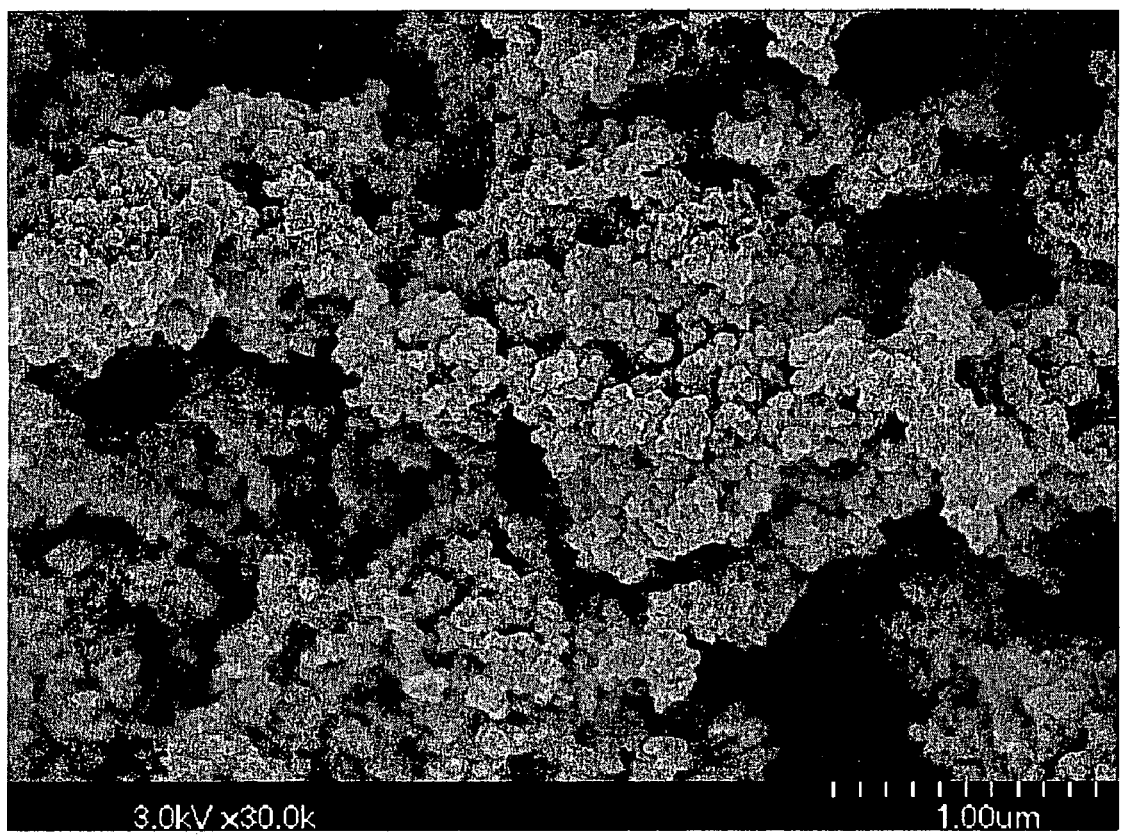
FIG. 3 depicts a scanning electron micrograph of the product of the process of Example 3.

Nitrogen porosimetry revealed a surface area of 89 $m^2/g$, a pore volume of 0.65 cc/g, and an average pore diameter of 293 Å. A Scanning Electron Microscopy image at 30,000× magnification, FIG. 3, shows porous agglomerates of $TiO_2$ crystals. The porosimetry data of this Example are reported in Table 6.

Example 4

This example illustrates that adding titanium oxychloride to a solution of $NH_4OH$ in n-propanol can produce a calcined mesoporous nanocrystalline $TiO_2$ powder having a high surface area and high porosity. 37.5 mL concentrated $NH_4OH$ were added to about 500 mL n-propanol while stirring with a Teflon coated magnetic stirring bar in a 1 L Pyrex beaker. With continued stirring, 35 mL of 50 wt. % $TiCl_4$ in water were added to the $NH_4OH$-propanol solution. The resulting slurry with pH 7 was stirred for 60 minutes at ambient temperature.

The solid was collected by suction filtration and dried under an IR heat lamp. The voluminous powder was transferred to alumina boats and heated uncovered, under flowing air in a tube furnace, from room temperature to about 450° C. over the period of one hour, and held at about 450° C. for an additional hour to ensure removal of the volatile $NH_4Cl$. The furnace was allowed to cool naturally to room temperature, and the fired material was recovered.

Figure 4:
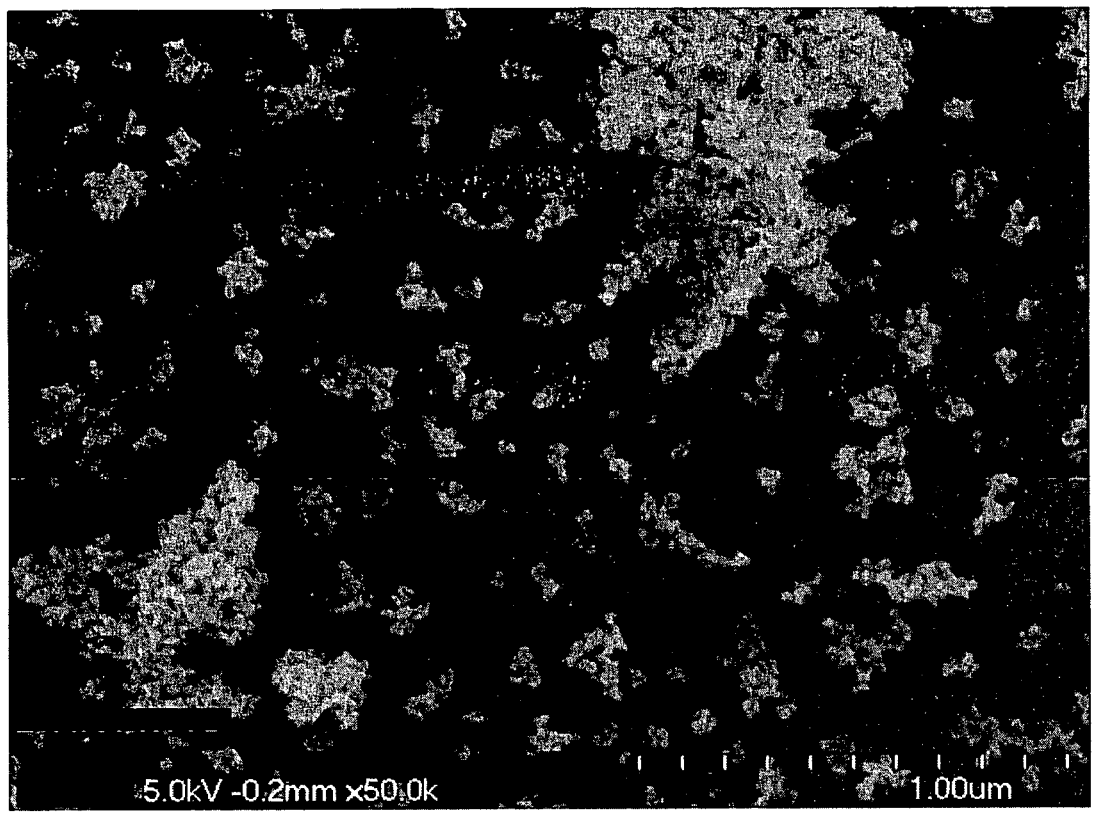
FIG. 4 depicts a scanning electron micrograph of the product formed in Example 4.

An X-ray powder diffraction pattern of the calcined material showed the broad lines of anatase and a trace of rutile. Nitrogen porosimetry revealed a surface area of 86 $m^2/g$, a pore volume of 0.93 cc/g, and an average pore diameter of 435 Å. FIG. 4 is a Scanning Electron Microscopy image of the product of this Example at 50,000× magnification showing very porous agglomerates of $TiO_2$ crystals. The porosimetry data of this Example are reported in Table 6.

Example 5

This example, where $NH_4OH$ is added to a solution of titanium oxychloride in n-propanol in the presence of a surfactant, describes a calcined mesoporous nanocrystalline $TiO_2$ powder having a high surface area and high porosity.

20.0 g (14 mL) of 50 wt. % $TiCl_4$ in water were added to about 200 mL of 5% wt Pluronic P123 (BASF Corp) surfactant in n-propanol while stirring with a Teflon coated magnetic stirring bar in a 400 mL Pyrex beaker. With stirring, 29 mL 1:1 $NH_4OH$ (i.e., 14-15% wt or 7.5 M) were added to the titanium solution. The resulting slurry was stirred for 60 minutes at ambient temperature.

Figure 6:
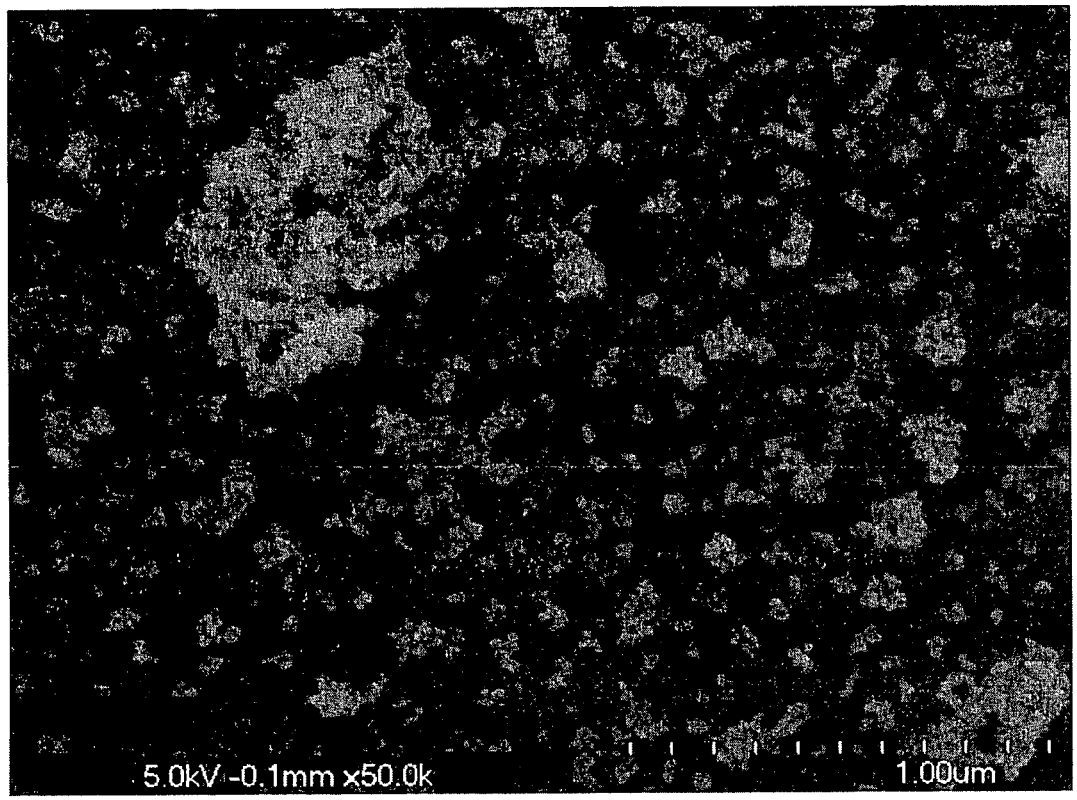

The solid was collected by suction filtration and dried under an IR heat lamp to yield 14.1 g of white powder. The powder was transferred to an alumina crucible and heated uncovered from room temperature to 450° C. over the period of one hour, and held at 450° C. for an additional hour to ensure removal of the volatile $NH_4Cl$ template. The crucible and its contents were removed from the furnace and cooled naturally to room temperature. An X-ray powder diffraction pattern of the calcined material showed broad lines of anatase (14 nm average crystal size), and a very small amount of rutile. Nitrogen porosimetry revealed a surface area of 91 $m^2/g$, a pore volume of 0.63 cc/g, and an average pore diameter of 276 Å. FIGS. 5 and 6 are scanning electron microscopy images with magnifications of 25,000× and 50,000×, respectively, showing very porous agglomerates of $TiO_2$ particles. The porosimetry data of this Example are reported in Table 6.

Example 6

This example illustrates that starting with neat $TiCl_4$ and concentrated aqueous $NH_4OH$ in n-propanol results in a calcined mesoporous nanocrystalline $TiO_2$ powder having a high surface area and high porosity.

10 g of 99.995 $TiCl_4$ were added to about 200 mL n-propanol while stirring with a Teflon coated magnetic stirring bar in a 400 mL Pyrex beaker. With stirring, 16 mL concentrated $NH_4OH$ were added to the titanium solution. The thick slurry was thinned with an additional small portion of n-propanol. The pH of the slurry, measured with water moistened multicolor strip pH paper, was about 7-8. The resulting slurry was stirred for 60 minutes at ambient temperature.

The solid was collected by suction filtration and dried under an IR heat lamp to yield 16.1 g of white powder. An X-ray powder diffraction pattern showed only the lines of $NH_4Cl$. A TGA of this mixture exhibited a total weight loss of 74% up to ~300° C. indicating that most of the $NH_4Cl$ had been precipitated along with the $TiO_2$.

The powder was transferred to an alumina crucible and heated uncovered from room temperature to 450° C. over the period of one hour, and held at 450° C. for an additional hour to ensure removal of the volatile $NH_4Cl$. The crucible and its contents were removed from the furnace and cooled naturally to room temperature. An X-ray powder diffraction pattern of the calcined material showed broad lines of anatase, a very small amount of brookite, and some amorphous material. Nitrogen porosimetry revealed a surface area of 89 $m^2/g$, a pore volume of 0.56 cc/g, and an average pore diameter of 251 Å. The porosimetry data of this Example are reported in Table 6.

Example 7

This example illustrates that adding $NH_4OH$ to a solution of titanium oxychloride in isopropanol results in a calcined mesoporous nanocrystalline $TiO_2$ powder having a high surface area and high porosity.

20.0 g (14 mL) of 50 wt. % $TiCl_4$ in water were added to about 200 mL isopropanol while stirring with a Teflon coated magnetic stirring bar in a 400 mL Pyrex beaker. With stirring, 30 mL 1:1 $NH_4OH$ (i.e., 14-15% wt or 7.5 M) were added to the titanium solution. The resulting slurry was stirred for 60 minutes at ambient temperature.

The solid was collected by suction filtration and dried under an IR heat lamp. An X-ray powder diffraction pattern showed only the lines of $NH_4Cl$.

The powder was transferred to an alumina crucible and heated uncovered from room temperature to 450° C. over the period of one hour, and held at 450° C. for an additional hour to ensure removal of the volatile $NH_4Cl$. The crucible and its contents were removed from the furnace and cooled naturally to room temperature.

An X-ray powder diffraction pattern of the calcined material showed only broad lines of anatase and some amorphous material. The average crystallite size of the anatase was estimated to be 11 nm from X-ray peak broadening analysis. Nitrogen porosimetry revealed a surface area of 78 $m^2/g$, a pore volume of 0.74 cc/g, and an average pore diameter of 378 Å. The porosimetry data of this Example are reported in Table 6.

Example 8

This example illustrates that adding $NH_4OH$ to a solution of titanium oxychloride in N,N' dimethylacetamide (DMAC) resulted in a calcined mesoporous nanocrystalline $TiO_2$ powder having a high surface area and high porosity.

20.0 g (14 mL) of 50 wt. % $TiCl_4$ in water were added to about 200 mL N,N' dimethylacetamide (DMAC) while stirring with a Teflon coated magnetic stirring bar in a 400 mL Pyrex beaker. With stirring, 29 mL 1:1 $NH_4OH$ were added to the titanium solution. The resulting slurry was stirred for 60 minutes at ambient temperature.

The solid was collected by suction filtration and dried under an IR heat lamp. The powder was transferred to an alumina crucible and heated uncovered from room temperature to 450° C. over the period of one hour, and held at 450° C. for an additional hour to ensure removal of the volatile $NH_4Cl$ porogen. The crucible and its contents were removed from the furnace and cooled naturally to room temperature. An X-ray powder diffraction pattern of the calcined material showed only broad lines of anatase with an average crystallite size of 13 nm. Nitrogen porosimetry revealed a surface area of 88 $m^2/g$, a pore volume of 0.68 cc/g, and an average pore diameter of 313 Å. The porosimetry data of this Example are reported in Table 6.

Example 9

This example illustrates that addition of $NH_4Cl$ to the aqueous slurry formed by reaction of $NH_4OH$ with titanium oxychloride results in a calcined mesoporous nanocrystalline $TiO_2$ powder having a high surface area and high porosity.

20.0 g (14 mL) of 50 wt. % $TiCl_4$ in water were added to about 200 mL deionized $H_2O$ while stirring with a Teflon coated magnetic stirring bar in a 400 mL Pyrex beaker. With stirring, 29 mL 1:1 $NH_4OH$ (i.e., 14-15% wt or 7.5 M) were added to the titanium solution. The pH of the slurry was about 8. After a few minutes, 89 g $NH_4Cl$ were added to the slurry, and the mixture was stirred for 60 minutes at ambient temperature.

The solid was collected by suction filtration and dried under an IR heat lamp. An X-ray powder diffraction pattern showed only the lines of $NH_4Cl$. The powder was transferred to an alumina crucible and heated uncovered from room temperature to about 450° C. over the period of one hour, and held at about 450° C. for an additional hour to ensure removal of the volatile $NH_4Cl$. The crucible and its contents were removed from the furnace and cooled naturally to room temperature.

An X-ray powder diffraction pattern of the calcined material showed the broad lines of anatase and a very small amount of brookite. Nitrogen porosimetry revealed a surface area of 80 $m^2/g$, a pore volume of 0.52 cc/g, and an average pore diameter of 260 Å. The porosimetry data of this Example are reported in Table 6.

Example 10

This example illustrates that adding $NH_4OH$ to a solution of $TiCl_4$ in n-propanol resulted in a washed and dried, uncalcined, mesoporous, $TiO_2$ powder having a very high surface area and high porosity.

12.5 g $TiCl_4$ were added to about 200 mL n-propanol while stirring with a Teflon coated magnetic stirring bar in a 400 mL Pyrex beaker. With stirring, 19 mL concentrated $NH_4OH$ were added to the titanium solution. The resulting slurry was stirred for 60 minutes at ambient temperature.

The solid was collected by suction filtration and dried under an IR heat lamp. The mixture was slurried in 1 L deionized water, stirred for 15 minutes, and collected by suction filtration. The latter step was repeated, but this time stirring of the slurry was extended to 90 minutes. After overnight drying at room temperature, a voluminous 7.7 g of powder was recovered. An X-ray powder diffraction pattern showed the washed $TiO_2$ to be amorphous. Nitrogen porosimetry measurements on this mixture revealed a surface area of 511 $m^2/g$, a pore volume of 0.86 cc/g, and an average pore diameter of 68 Å. The porosimetry data of this Example are reported in Table 6.

Comparative Example E

This example shows that calcination of the washed and dried $TiO_2$ product of Example 10, which no longer contains sufficient $NH_4Cl$ porogen, does not give a nanocrystalline $TiO_2$ powder having the high surface area and high porosity of $TiO_2$ made by processes of this invention.

The washed and dried powder in Example 10 was transferred to an alumina crucible and heated uncovered from room temperature to 450° C. over the period of one hour, and held at 450° C. for an additional hour to ensure removal of the volatile $NH_4Cl$. The crucible and its contents were removed from the furnace and cooled naturally to room temperature. X-ray powder diffraction of the calcined material showed only broad lines of anatase and some amorphous material. Nitrogen porosimetry revealed a surface area of 61 $m^2/g$, a pore volume of 0.34 cc/g, and an average pore diameter of 223 Å. The porosimetry data of this Example are reported in Table 6.

Example 11

This example, where $NH_4OH$ is added to a solution of titanium oxychloride in n-propanol in the presence of a surfactant, describes a washed and dried, uncalcined mesoporous $TiO_2$ powder having a very high surface area and high porosity.

Example 5 was repeated, but rather than drying and calcining, the filtered, undried product cake was slurried with 1 L deionized water, stirred for 75 minutes, and collected by suction filtration. This washing step was repeated two more times. The filtered white powder was dried under an IR heat lamp. An X-ray powder diffraction pattern showed the washed and dried product to be amorphous. Nitrogen porosimetry revealed a surface area of 526 $m^2/g$, a pore volume of 0.47 cc/g, and an average pore diameter of 35 Å. The porosimetry data of this Example are reported in Table 6.

Example 12

This example demonstrates the utility of the mesoporous, titanium dioxide product as a nanoparticle precursor. Micron size $TiO_2$ particles are deagglomerated by a factor of 100-500, e.g., particles having a $d_{50}$~50 µm are reduced in size to have $d_{50}$~0.100 µm (100 nm).

$TiO_2$ powders from Examples 1, 4, and 5 above were dispersed by shaking in water containing 0.1 wt % TSPP surfactant. The particle size distributions for these powders before and after 20 minutes of sonication are shown in Table 3.

TABLE 3

| $TiO_2$ powder | $d_{50}$ (µm) as prepared | $d_{50}$ (µm) after 20 min. sonication |
|---|---|---|
| Example 1 | 46.7 | 0.088 |
| Example 4 | 11.3 | 0.110 |
| Example 5 | 23.7 | 0.130 |

Example 13

This example demonstrates the utility of the nanocrystalline, mesoporous titanium dioxide in a photovoltaic device. $TiO_2$ powder made as described in Example 3, was blended with a binder and cast into a film on an electrically-conducting fluorine-doped tin-oxide (FTO) coated glass substrate. This anode was assembled into a dye-sensitized solar cell and tested as described in section 2.5 of "Engineering of Efficient Panchromatic Sensitizers for Nanocrystalline TiO2-Based Solar Cells", M. K. Nazeeruddin, et al., J. Am. Chem. Soc., volume 123, pp. 1613-1624, 2001. A control experiment using Degussa P25 $TiO_2$ was used for comparison. The cell containing $TiO_2$ of this invention exhibited a higher power conversion efficiency, relative to that of the control cell. The results are reported in Table 4.

TABLE 4

| $TiO_2$ film | Relative power conversion efficiency |
|---|---|
| Example 3 | 1.13 |
| Degussa P25 | 1.00 |

Example 14

This example demonstrates the utility of the nanocrystalline, mesoporous titanium dioxide in an optical device. The index of refraction of a polymethylmethacrylate (PMMA) polymer film was modified by blending the PMMA polymer with $TiO_2$ powder from Example 4 to make composite films containing 5% wt $TiO_2$. The results are reported in Table 5.

TABLE 5

| Film | index of refraction at 1550 nm |
|---|---|
| PMMA (two sample films) | 1.479, 1.479 |
| PMMA + $TiO_2$ from Example 4 (two composite sample films) | 1.512, 1.514 |

Comparative Example F

This example shows that reaction of $ZrOCl_2.8H_2O$ with $NH_4OH$ in water does not result in calcined $ZrO_2$ as obtained via aqueous saturated $NH_4Cl$ solution.

11.0 g $ZrOCl_2.8H_2O$ were dissolved in 100 mL deionized $H_2O$ while stirring with a Teflon coated magnetic stirring bar in a 250 mL Pyrex beaker. With stirring, 10 mL concentrated $NH_4OH$ were added to the zirconium solution. The pH of the slurry, measured with multi-color strip pH paper, was about 10. The resulting slurry was stirred for 60 minutes at ambient temperature.

The solid was collected by suction filtration and dried under an IR heat lamp. The powder was transferred to an alumina crucible and heated uncovered from room temperature to 450° C. over the period of one hour, and held at 450° C. for an additional hour. The crucible and its contents were removed from the furnace and cooled naturally to room temperature.

An X-ray powder diffraction pattern of the calcined material showed a mixture of the monoclinic and tetragonal forms of $ZrO_2$ with the crystallites ranging 11-16 nm in size. Nitrogen porosimetry revealed a surface area of 63.4 $m^2/g$, a pore volume of 0.13 cc/g, and an average pore diameter of 84 Å. The porosimetry data of this Example are reported in Table 6.

Example 15

This example, using $ZrOCl_2.8H_2O$ in aqueous saturated $NH_4Cl$ solution, illustrates the synthesis of calcined $ZrO_2$ product in accordance with this invention.

11.0 g $ZrOCl_2.8H_2O$ were dissolved in 100 mL aqueous $NH_4Cl$ solution saturated at room temperature, while stirring with a Teflon coated magnetic stirring bar in a 250 mL Pyrex beaker. With stirring, 20 mL 1:1 $NH_4OH:H_2O$ were added to the zirconium solution. The pH of the slurry, measured with multi-color strip pH paper, was about 10. The resulting slurry was stirred for 60 minutes at ambient temperature.

The solid was collected by suction filtration and dried under an IR heat lamp. The powder was transferred to an alumina crucible and heated uncovered from room temperature to 450° C. over the period of one hour, and held at 450° C. for an additional hour. The crucible and its contents were removed from the furnace and cooled naturally to room temperature.

An X-ray powder diffraction pattern of the calcined material showed only the tetragonal form of $ZrO_2$ with 7 nm crystals. Nitrogen porosimetry revealed a surface area of 84 $m^2/g$, a pore volume of 0.31 cc/g, and an average pore diameter of 146 Å. The porosimetry data of this Example are reported in Table 6.

Example 16

This example, using $ZrOCl_2.8H_2O$ illustrates the synthesis of calcined product via addition of $NH_4Cl$ after forming the $ZrO_2$ precipitate.

11.0 g $ZrOCl_2.8H_2O$ were dissolved in 100 mL deionized H2O at room temperature while stirring with a Teflon coated magnetic stirring bar in a 250 mL Pyrex beaker. With stirring, 10 mL concentrated $NH_4OH$ were added to the zirconium solution. After a few minutes, 45 g $NH_4Cl$ were added to the slurry, and the mixture was stirred for 60 minutes at ambient temperature.

The solid was collected by suction filtration and dried under an IR heat lamp. The powder was transferred to an alumina crucible and heated uncovered from room temperature to 450° C. over the period of one hour, and held at 450° C. for an additional hour. The crucible and its contents were removed from the furnace and cooled naturally to room temperature.

An X-ray powder diffraction pattern of the calcined material showed only the tetragonal form of $ZrO_2$ with 7 nm crystals. Nitrogen porosimetry revealed a surface area of 81.5 $m^2/g$, a pore volume of 0.38 cc/g, and an average pore diameter of 187 Å. The porosimetry data of this Example are reported in Table 6.

Comparative Example G

Reaction of $HfOCl_2.8H_2O$ with $NH_4OH$ in water does not give $HfO_2$, calcined, as obtained via aqueous saturated $NH_4Cl$ solution.

10.0 g $HfOCl_2.8H_2O$ were dissolved in 200 mL deionized $H_2O$ while stirring with a Teflon coated magnetic stirring bar in a 250 mL Pyrex beaker. With stirring, 3.5 mL concentrated $NH_4OH$ were added to the hafnium solution. The pH of the slurry, measured with multi-color strip pH paper, was about 8-9. The resulting slurry was stirred for 60 minutes at ambient temperature.

The solid was collected by suction filtration and dried under an IR heat lamp. The powder was transferred to an alumina crucible and heated uncovered from room temperature to 450° C. over the period of one hour, and held at 450° C. for an additional hour. The crucible and its contents were removed from the furnace and cooled naturally to room temperature.

An X-ray powder diffraction pattern of the calcined material showed it to be amorphous. Nitrogen porosimetry revealed a surface area of 62.5 $m^2/g$, a pore volume of 0.05 cc/g, and an average pore diameter of 29 Å. The porosimetry data of this Example are reported in Table 6.

Example 17

This example, using $HfOCl_2.8H_2O$ in aqueous saturated $NH_4Cl$ solution, illustrates the synthesis of calcined $HfO_2$ product.

10.0 g $HfOCl_2.8H_2O$ were dissolved in 200 mL aqueous $NH_4Cl$ solution saturated at room temperature, while stirring with a Teflon coated magnetic stirring bar in a 250 mL Pyrex beaker. With stirring, 3.5 mL concentrated $NH_4OH$ were added to the hafnium solution. The pH of the slurry, measured with multi-color strip pH paper, was about 8. The resulting slurry was stirred for 60 minutes at ambient temperature.

The solid was collected by suction filtration and dried under an IR heat lamp. The powder was transferred to an alumina crucible and heated uncovered from room temperature to 450° C. over the period of one hour, and held at 450° C. for an additional hour. The crucible and its contents were removed from the furnace and cooled naturally to room temperature.

An X-ray powder diffraction pattern of the calcined material showed only the monoclinic form of $HfO_2$ with crystallites approximately 8-11 nm in size. Nitrogen porosimetry revealed a surface area of 49.9 $m^2/g$, a pore volume of 0.20 cc/g, and an average pore diameter of 161 Å. The porosimetry data of this Example are reported in Table 6.

Example 18

This example, using $HfOCl_2.8H_2O$ illustrates the synthesis of calcined product via addition of $NH_4Cl$ after forming the $HfO_2$ precipitate.

10.0 g $HfOCl_2.8H_2O$ were dissolved in 200 mL deionized $H_2O$ at room temperature while stirring with a Teflon coated magnetic stirring bar in a 250 mL Pyrex beaker. With stirring, 3.5 mL concentrated $NH_4OH$ were added to the zirconium solution. After a few minutes, 85 g $NH_4Cl$ were added to the slurry, and the mixture was stirred for 60 minutes at ambient temperature.

The solid was collected by suction filtration and dried under an IR heat lamp. The powder was transferred to an alumina crucible and heated uncovered from room temperature to 450° C. over the period of one hour, and held at 450° C. for an additional hour. The crucible and its contents were removed from the furnace and cooled naturally to room temperature.

An X-ray powder diffraction pattern of the calcined material showed only the monoclinic form of $HfO_2$ with crystallites 8-10 nm in size. Nitrogen porosimetry revealed a surface area of 53.2 $m^2/g$, a pore volume of 0.17 cc/g, and an average pore diameter of 130 Å.

The surface area and pore characteristics of the products of the examples are reported in the following Table 6.

TABLE 6

| Example | Material | Surface Area, $m^2/g$ | Pore Vol. (cc/g) | Ave. Pore Diam. (Å) |
|---|---|---|---|---|
| Comparative A uncalcined | $TiO_2$ | 398 | 0.37 | 37 |
| Comparative A calcined | | 72 | 0.17 | 95 |
| Comparative B uncalcined | | 215 | 0.17 | 31 |
| Comparative B calcined | | 70 | 0.25 | 146 |
| Comparative C | | 75.8 | 0.24 | 129 |
| Comparative D-I | | 82 | 0.4 | 193 |
| Comparative D-II | | 74 | 0.37 | 202 |
| Comparative D-III | | 109 | 0.28 | 105 |
| 1 | | 88 | 0.72 | 325 |
| 2 | | 84 | 0.78 | 371 |
| 3 | | 89 | 0.65 | 293 |
| 4 | | 86 | 0.93 | 435 |
| 5 | | 91 | 0.63 | 276 |
| 6 | | 89 | 0.56 | 251 |
| 7 | | 78 | 0.74 | 378 |
| 8 | | 88 | 0.68 | 313 |
| 9 | | 80 | 0.52 | 260 |
| 10 | | 511 | 0.86 | 68 |
| Comparative E | | 61 | 0.34 | 223 |
| 11 | | 526 | 0.47 | 35 |
| Comparative F | $ZrO_2$ | 63.4 | 0.13 | 84 |
| 15 | | 84 | 0.31 | 146 |
| 16 | | 81.5 | 0.38 | 187 |
| Comparative G | $HfO_2$ | 62.5 | 0.05 | 29 |
| 17 | | 49.9 | 0.20 | 161 |
| 18 | | 53.2 | 0.17 | 130 |

The data of Table 6 show that this invention provides mesoporous products having high surface areas and high pore volumes and high average pore diameters. While the surface area of the uncalcined titanium-containing product of Comparative Examples A and B was high it was not as high as the uncalcined product of Example 10. Also, the pore volume and average pore diameter of the uncalcined product of Comparative Examples A and B was lower than that of titanium-containing product of Example 10.

While the surface area of the calcined product of Comparative Example D-III was higher than that of Examples 1-9 the pore volume and average pore diameter of the calcined product of Comparative Example D-III was much lower than that of the calcined product of Examples 1-9. Moreover, while the surface area of the product of example D-I was slightly higher than Examples 7 and 9 and the pore volume and average pore diameter were lower.

What is claimed is:

1. A process for making a mesoporous oxide of hafnium, the process comprising:
   forming a precipitate comprising an ionic porogen which is a halide salt selected from the group consisting of ammonium halide, tetramethyl ammonium halide, tetraethyl ammonium halide and combinations thereof and a hydrous oxide of hafnium from a reaction mixture comprising a hafnium starting material selected from the group consisting of hafnium tetrachloride, hafnium oxychloride octahydrate and combination thereof, a base selected from the group consisting of ammonium hydroxide, ammonium carbonate, ammonium bicarbonate, tetramethyl ammonium hydroxide, tetraethyl ammonium hydroxide and combinations thereof, and a solvent selected from the group consisting of ethanol, n-propanol, i-propanol, dimethyl acetamide, alcoholic ammonium halide, aqueous ammonium halide and combinations thereof, wherein the hafnium starting material or the solvent, or both, are a source of the anion for the ionic porogen and the base is the source of the cation for the ionic porogen; and
   removing the ionic porogen from the precipitate to recover a mesoporous oxide of hafnium having a pore volume of at least about 0.1 cc/g and an average pore diameter of at least about 100 Å.

2. The process of claim 1 wherein the halide salt is ammonium chloride.

3. The process of claim 1 wherein the ionic porogen is removed by calcining.

4. The process of claim 1 wherein the mesoporous oxide is crystalline.

5. The process of claim 1 wherein the oxide of hafnium further comprises a dopant.

6. The process of claim 5 wherein the dopant is a transition metal, a Group IIA, IIIA, IVA, or VA metal.

7. The process of claim 5 wherein the dopant is Ge, P, As, Sb, Bi, Ni, Cu, Al, Zr, Hf, Si, Nb, Ta, Fe, Sn, Co, Zn, Mo, W, V, Cr, Mn, Mg, Ca, Sr, Ba, Ga, or In.

8. The process of claim 1 wherein the halide of the halide salt, the alcoholic ammonium halide, or the aqueous ammonium halide is chloride, bromide or iodide or combinations thereof.

9. The process of claim 1 wherein the reaction mixture is formed by the steps, in order, of combining the base and the solvent to form a solution or a mixture and adding the hafnium starting material to the solution or mixture.

10. The process of claim 1 wherein the reaction mixture is formed by combining the hafnium starting material and the solvent to form a solution or a mixture and adding the base to the solution or mixture.

11. The process of claim 1 wherein more than about 50 weight percent of the halide salt precipitates from the reaction mixture, the weight percent based on the total amount of the halide salt that can form from the reaction mixture.

12. The process of claim 1 wherein more than about 70 weight percent of the halide salt precipitates from the reaction mixture, the weight percent based on the total amount of the halide salt that can form from the reaction mixture.

13. The process of claim 1 wherein more than about 90 weight percent of the halide salt precipitates from the reaction mixture, the weight percent based on the total amount of the halide salt that can form from the reaction mixture.

14. A process for making a mesoporous oxide of hafnium, the process comprising:
   forming a mixture of a solid hydrolyzed starting material comprising hafnium and a liquid medium;
   adding a sufficient quantity of a halide salt to the mixture to saturate the liquid medium of the mixture and form a solid comprising a hydrolyzed intermediate comprising hafnium, the intermediate having pores containing the saturated liquid medium; and removing the saturated liquid medium from the solid to recover a mesoporous oxide of hafnium having a pore volume of at least about 0.1 cc/g and an average pore diameter of at least about 100 Å.

15. The process of claim 14 wherein the liquid medium is the liquid portion of the mixture which comprises a solvent.

16. The process of claim 14 wherein the liquid medium comprises a dissolved salt.

17. The process of claim 15 wherein the solvent is ethanol, n-propanol, i-propanol, dimethyl acetamide, alcoholic ammonium halide or aqueous ammonium halide or combinations thereof.

18. The process of claim 14 wherein the halide is chloride, bromide or iodide or combinations thereof.

19. The process of claim 14 wherein the halide salt is ammonium halide, tetramethyl ammonium halide or tetraethyl ammonium halide or combinations thereof.

20. The process of claim 14 wherein the halide salt is ammonium chloride.

21. The process of claim 14 wherein the step of removing the saturated liquid medium comprises drying and calcining.

22. The process of claim 14 wherein the mesoporous oxide is crystalline.

23. The process of claim 14 wherein the oxide of hafnium further comprises a dopant.

24. The process of claim 23 wherein the dopant is a transition metal, a Group IIA, IIIA, IVA, or VA metal.

25. The process of claim 24 wherein the dopant is Ge, P, As, Sb, Bi, Ni, Cu, Al, Zr, Hf, Si, Nb, Ta, Fe, Sn, Co, Zn, Mo, W, V, Cr, Mn, Mg, Ca, Sr, Ba, Ga, or In.

26. The process of claim 14 wherein the hydrolyzed starting material comprising hafnium is derived from hafnium tetrachloride or hafnium oxychloride octahydrate.

27. The process of claims 1 or 14 wherein the mesoporous oxide of hafnium comprises $HfO_2$ having a surface area at least about 40 m2/g, a pore volume of at least about 0.1 cc/g, and an average pore diameter of at least about 100 Å.

* * * * *

UNITED STATES PATENT AND TRADEMARK OFFICE
CERTIFICATE OF CORRECTION

PATENT NO.        : 7,601,327 B2
APPLICATION NO. : 11/170991
DATED             : October 13, 2009
INVENTOR(S)       : Carmine Torardi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 425 days.

Signed and Sealed this

Fifth Day of October, 2010

David J. Kappos
*Director of the United States Patent and Trademark Office*